(12) United States Patent
Ito

(10) Patent No.: US 11,126,487 B2
(45) Date of Patent: Sep. 21, 2021

(54) COMMUNICATION SYSTEM, COMMUNICATION DEVICE, AND RECORDING MEDIUM

(71) Applicant: Mitsubishi Electric Corporation, Tokyo (JP)

(72) Inventor: Naoki Ito, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 17/272,351

(22) PCT Filed: Sep. 6, 2018

(86) PCT No.: PCT/JP2018/033097
§ 371 (c)(1),
(2) Date: Mar. 1, 2021

(87) PCT Pub. No.: WO2020/049698
PCT Pub. Date: Mar. 12, 2020

(65) Prior Publication Data
US 2021/0182138 A1 Jun. 17, 2021

(51) Int. Cl.
*G06F 11/00* (2006.01)
*G06F 11/07* (2006.01)
*H04L 1/16* (2006.01)

(52) U.S. Cl.
CPC ........ *G06F 11/0757* (2013.01); *H04L 1/1678* (2013.01)

(58) Field of Classification Search
CPC ............... G06F 11/0757; G06F 11/076; G06F 11/1604; G06F 11/08
See application file for complete search history.

(56) References Cited

U.S. PATENT DOCUMENTS

| 2003/0063688 | A1 | 4/2003 | Noda |
| 2004/0008681 | A1* | 1/2004 | Govindarajan ......... H04L 29/06 370/394 |
| 2016/0218946 | A1* | 7/2016 | Ellerbrock .......... G06F 11/0757 |

FOREIGN PATENT DOCUMENTS

| JP | 2003-110644 A | 4/2003 |
| JP | 2003-298563 A | 10/2003 |

OTHER PUBLICATIONS

International Search Report and Written Opinion dated Nov. 6, 2018, received for PCT Application PCT/JP2018/033097 Filed on Sep. 6, 2018, 8 pages including English Translation.

(Continued)

*Primary Examiner* — Katherine Lin
(74) *Attorney, Agent, or Firm* — Xsensus LLP

(57) ABSTRACT

A clock value converter in a CPU replaces a value of a carry counter in a safety clock in the CPU to cause the carry counter to show dispersed values. The CPU transmits a frame including a value of a time stamp and a first error detecting code generated based on the value of the time stamp and the value of the carry counter to a CPU. A clock value converter in the CPU causes, as in the CPU, a carry counter in a safety clock in the CPU to show dispersed values. An error detector in the CPU determines whether a second error detecting code generated based on the value of the received time stamp and a value of the carry counter in the safety clock in the CPU satisfies a condition set for the first error detecting code.

19 Claims, 15 Drawing Sheets

(56) References Cited

OTHER PUBLICATIONS

Igarashi, "CC-Link IE Field Safety Telecommunication Technology", Mitsubishi Denki Giho., vol. 85, No. 4, Apr. 25, 2011, pp. 37-40 (Including English Translation).
Decision to Grant dated May 21, 2019, received for JP Application 2019-521506, 5 pages including English Translation.

* cited by examiner

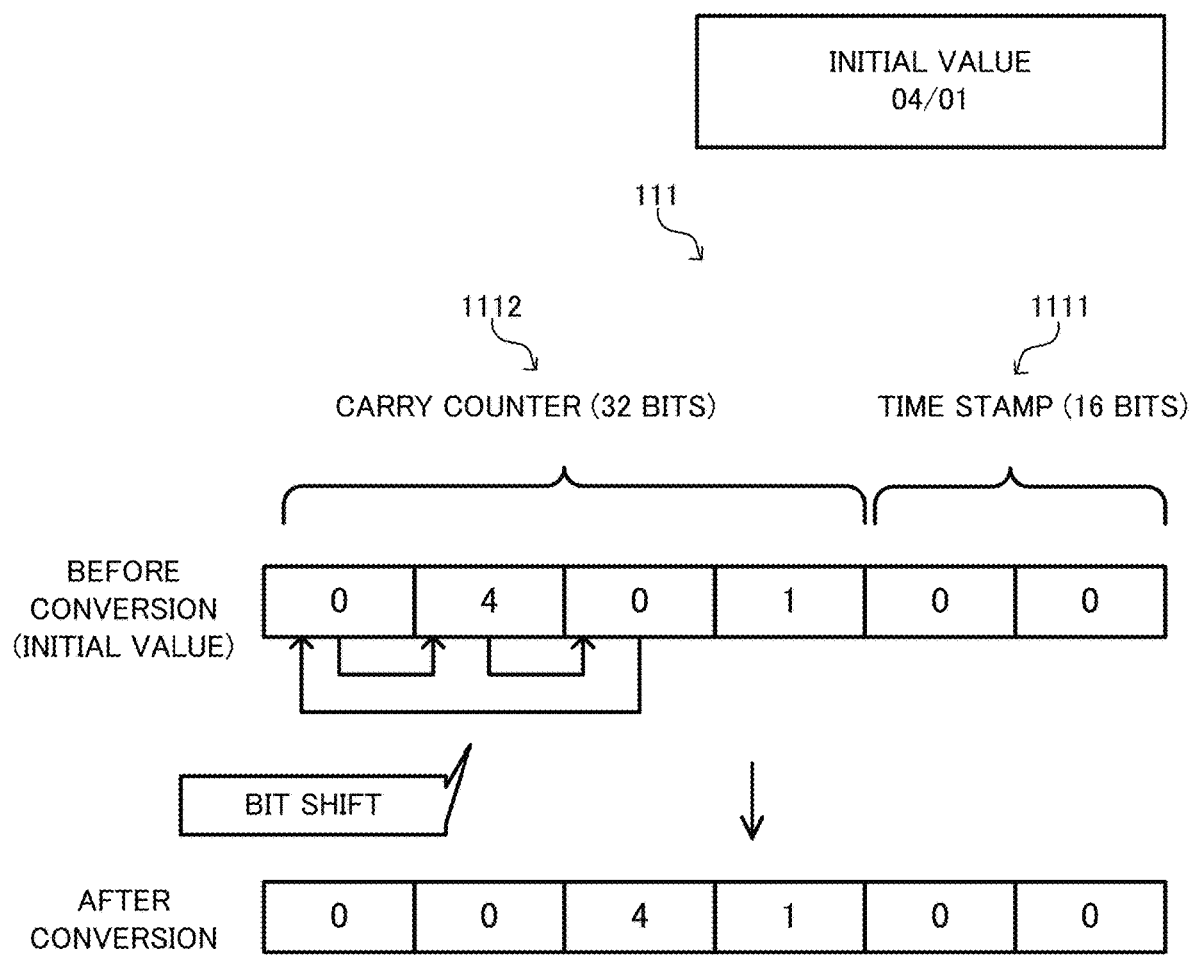

FIG.15

MANAGEMENT INFORMATION

| SLAVE | SAFETY CLOCK | CONVERSION METHOD | CONVERSION TIMING |
|---|---|---|---|
| PROGRAMMABLE LOGIC CONTROLLER 3 | SAFETY CLOCK 111a | BIT SHIFT: CYCLIC RIGHTWARD SHIFTING OF UPPER 24 BITS PER 8 BITS | EVERY 2 MILLISECONDS |
| PROGRAMMABLE LOGIC CONTROLLER 4 | SAFETY CLOCK 116a | RANDOM NUMBER GENERATION: ALGORITHM 2000, SEED 3000Y | EVERY 1 MILLISECOND |

117

COMMUNICATION SYSTEM, COMMUNICATION DEVICE, AND RECORDING MEDIUM

CROSS-REFERENCE TO RELATED APPLICATION

The present application is based on PCT filing PCT/JP2018/033097, filed Sep. 6, 2018, the entire contents of which are incorporated herein by reference.

TECHNICAL FIELD

The present disclosure relates to a communication system, a communication device, a method, and a program.

BACKGROUND ART

In the field of factory automation, the reliability of communication is to be increased for functional safety. Functional safety refers to an acceptable level of safety achievable by providing safety maintenance functions.

To improve communication reliability, real-time communication is to be achieved. Devices at a factory transmit and receive safety control information to and from one another. Examples of safety control information include information about a push on an emergency stop switch and a command of power shutdown for an emergency stop. Such safety control information is to arrive at the destination device without delay.

To detect delay of data, for example, a device at a factory transmits data with time information appended representing the transmission time to another device. The device receiving the data determines, based on the received time information, whether the data has arrived within an appropriate time period. Patent Literature 1 describes a transmitter that transmits data with time information appended, and a receiver that compares the received time information with time information indicated by a clock included in the receiver.

Examples of a known clock include a clock generator circuit that generates a clock signal per set time, and a counter that counts clock signals output by the clock generator circuit. FIG. 4A shows the configuration of a known counter. In the illustrated example, the counter includes a time stamp 11 serving as a counter that counts clock signals, and a carry counter 12 that is incremented when the time stamp overflows. A clock can measure time. The time stamp 11 and the carry counter 12 are thus sequentially incremented. Each of the time stamp 11 and the carry counter 12 has an initial value of, for example, zero or a current date.

For higher communication reliability, data is to be transmitted correctly. Bit errors, such as a missing part of coded data or a reversal between 0 and 1 in a part of coded data, may occur over a transmission line. In response to bit errors during transmission of data relating to the above safety control, erroneous data different from intended data may be transmitted to a receiver, causing the receiver to operate unexpectedly. To achieve safety, the safety control information is to be transmitted correctly.

A standard relating to functional safety, IEC 61784-3, defines an allowable residual error rate for each target level of defined safety. Residual errors refer to errors that are left without being detected in error detection performed by a communication device on received data to detect bit errors over a transmission line. The standard IEC 61784-3 defines a method for calculating the residual error rate representing residual error probability. For functional safety, the residual error rate is to be low. However, residual errors are left without being detected in error detection. The rate of detection of residual errors thus cannot be increased readily.

The standard IEC 61784-3 also describes the use of the probability of occurrence of values that frequently occur in transmitted data for calculating the residual error rate. In other words, the probability of a specific value that occurs highly frequently is used for calculating the residual error rate. This calculation uses high occurrence probability and thus yields a high residual error rate.

As described above, time information appended to transmitted data may also cause bit errors, and thus undergoes error detection. The time stamp 11 in the clock is designed to count a sufficiently long time. The time stamp 11 that overflows in a very short period may overflow during data transmission. The time stamp appended for transmission may be the same as the time stamp at the reception. Thus, the time stamp 11 is less likely to overflow. Any overflow of the time stamp 11 may be followed by a next overflow after a long time. The frequency of increment of the carry counter 12 is thus very low.

Thus, the carry counter 12 is more likely to retain an initial value or have a value near the initial value. In other words, the initial value or a value near the initial value is highly likely to occur as the value of the carry counter 12.

CITATION LIST

Patent Literature

Patent Literature 1: Unexamined Japanese Patent Application Publication No. 2003-298563

SUMMARY OF INVENTION

Technical Problem

For the carry counter 12 set to zero as an initial value, as shown in FIG. 5A, zero or a value close to zero is highly likely to occur as the value of the carry counter 12. The probability of occurrence of zero as the value of the carry counter 12 is used for calculating the residual error rate. As shown in FIG. 5B, when the carry counter 12 is set to the current date as an initial value, the date set as the initial value or close to the set date is highly likely to occur as the value of the carry counter 12. In this case, the probability of occurrence of the date set as the value of the carry counter 12 is used for calculating the residual error rate. The carry counter 12 in a known clock thus has a high frequency of occurrence of a specific value. The high occurrence probability is to be used for calculating the residual error rate. The residual error rate is thus difficult to be reduced.

An objective of the present disclosure is to cause a clock counter to show values at dispersed frequencies to reduce the residual error rate.

Solution to Problem

To achieve the above objective, a communication system according to an aspect of the present disclosure includes a first communication device and a second communication device that communicate with each other. First clock means in the first communication device includes a first counter to count an elapsed time and a second counter to count an overflow of the first counter. First data conversion means in the first communication device replaces a value of the second counter with a value generated at predetermined timing with a predetermined method to cause the second counter to show dispersed values. First error detecting means in the first communication device generates a first error detecting code based on a value of the first counter and a value of the second counter. First communication means in the first communication device generates a frame including data to be forwarded to the second communication device, and the value of the first counter and the first error detecting code added to the data, and transmits the generated frame to the second communication device. Second clock means in the second communication device includes a third counter to count an elapsed time and a fourth counter to count an overflow of the third counter. Second data conversion means in the second communication device replaces a value of the fourth counter with a value generated at the predetermined timing with the predetermined method to cause the fourth counter to show dispersed values. Second communication means in the second communication device receives the frame from the first communication device. Second error detecting means in the second communication device generates a second error detecting code based on the value of the first counter included in the frame and the value of the fourth counter in the second clock means, and determines whether the generated second error detecting code satisfies a condition set for the first error detecting code included in the frame.

Advantageous Effects of Invention

A first communication device in a communication system according to the present disclosure replaces the value of a second counter that counts overflows of the first counter with a value generated at set timing with a set method to cause the second counter to show dispersed values. Similarly to the first communication device, a second communication device replaces a value of a fourth counter that counts overflows of a third counter with a value generated at set timing with a set method to cause the fourth counter to show dispersed values. This structure can thus cause a clock counter to show values at dispersed frequencies.

BRIEF DESCRIPTION OF DRAWINGS

FIG. 6 is a diagram showing a method of data conversion through a bit shift performed by the safety clock according to Embodiment 1;

FIG. 15 is a table showing example data stored in management information according to Embodiment 3;

DESCRIPTION OF EMBODIMENTS

A communication system 10 according to an embodiment of the present disclosure will be described in detail with reference to the drawings.

Embodiment 1

Figure 1:
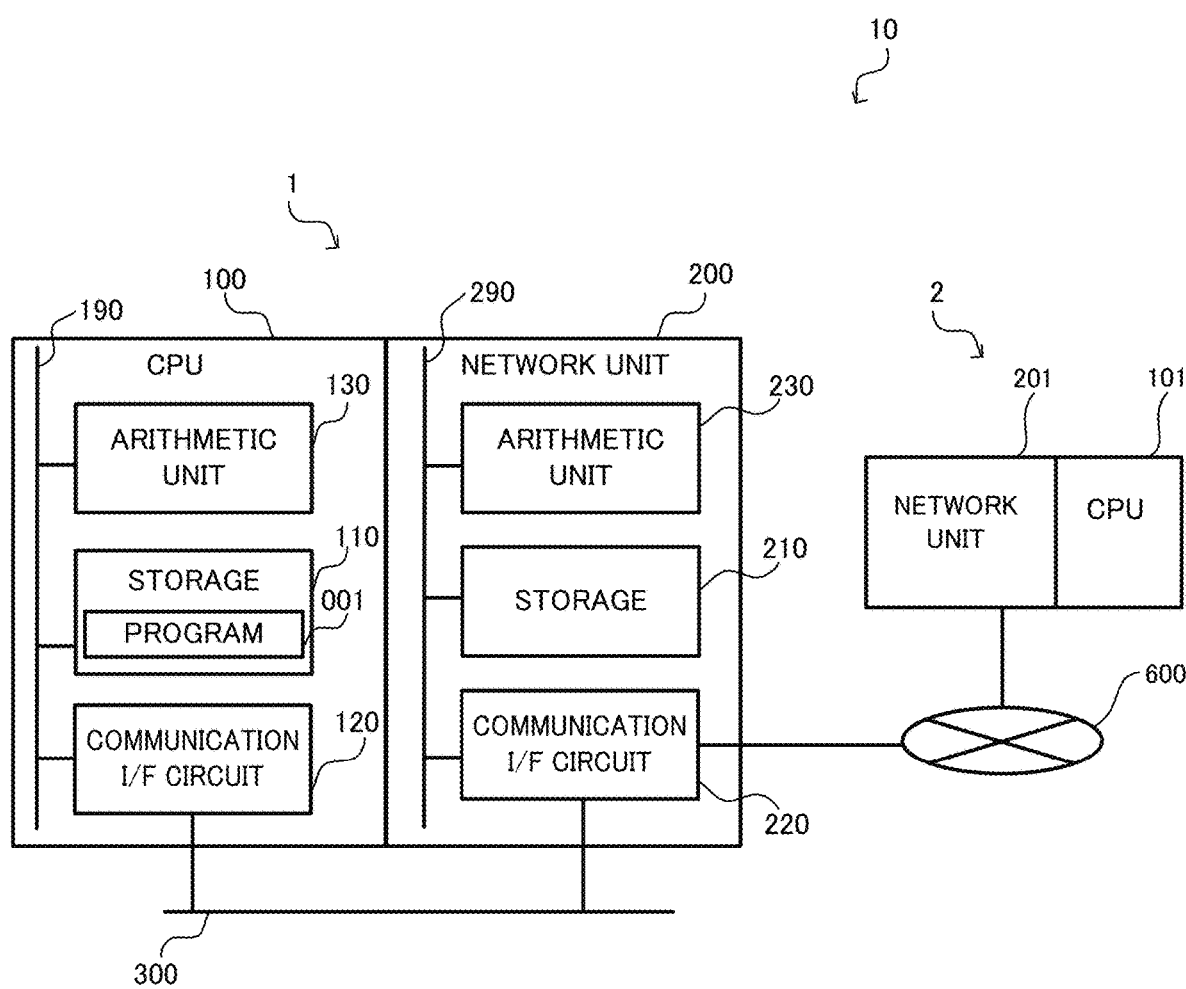
FIG. 1 is a block diagram of a communication system according to Embodiment 1, showing its hardware configuration.

As shown in FIG. 1, the communication system 10 according to Embodiment 1 includes programmable logic controllers 1 and 2 that communicate with each other over a network 600. The programmable logic controllers 1 and 2 control, for example, detectors or controllable devices that operate in, for example, a production system or a control system. The controllable devices include actuators and servomotors for industrial robots. The programmable logic controller 1 is an example of a first communication device, and the programmable logic controller 2 is an example of a second communication device. The programmable logic controller 1 is also an example of a different communication device, and the programmable logic controller 2 is also an example of a communication device. The programmable logic controller 1 is also an example of a first computer, and the programmable logic controller 2 is also an example of a second computer.

The programmable logic controller 1 includes a central processing unit (CPU) 100 and a network unit 200. The CPU 100 and the network unit 200 are mounted on a base unit together with a power supply (not shown), and operate with power fed from the power supply. The CPU 100 and the network unit 200 are connected together with a common bus 300, and communicate with each other via the common bus 300. The CPU 100 controls the entire programmable logic controller 1. The network unit 200 communicates with, for example, other network units, detectors, and controllable devices under control by the CPU 100.

The programmable logic controller 2 includes a CPU 101 and a network unit 201. Although the programmable logic controller 1 is described as an example below, the programmable logic controller 2 also has the same configuration as the programmable logic controller 1.

In Embodiment 1, the programmable logic controllers 1 and 2 perform communication for functional safety. More specifically, when determining that received data does not arrive within an expected time period, the programmable logic controllers 1 and 2 determine a command in the received data to be invalid and discard the received data. Thus, the CPUs 100 and 101 respectively include clocks that are timing devices operating in synchronization with each other. The clocks in the CPUs 100 and 101 will be described later.

As shown in FIG. 1, the CPU 100 includes, as hardware components, a storage 110 that stores various data sets, a communication interface (I/F) circuit 120 that communicates with the network unit 200 via the common bus 300, and an arithmetic unit 130 that controls the entire CPU 100. The storage 110 and the communication I/F circuit 120 are connected to the arithmetic unit 130 with an internal bus 190 to communicate with the arithmetic unit 130. Although the CPU 100 is described as an example below, the CPU 101 in the programmable logic controller 2 has the same configuration.

The storage 110 includes a volatile memory and a non-volatile memory and stores programs and various data sets. The storage 110 is used as a work memory of the arithmetic unit 130. The storage 110 stores a program 001 to be executed by the arithmetic unit 130 for implementing data conversion and error detection (described later).

Under control by the arithmetic unit 130, the communication I/F circuit 120 transmits and receives data to and from the network unit 200 via the common bus 300. The communication I/F circuit 120 transmits data output from the arithmetic unit 130 to the network unit 200 via the common bus 300. Example data transmitted by the communication I/F circuit 120 to the network unit 200 includes a command transmitted by the CPU 100 in the programmable logic controller 1 to the CPU 101 in the programmable logic controller 2. The communication I/F circuit 120 outputs data received from the network unit 200 via the common bus 300 to the arithmetic unit 130. Example data received by the communication I/F circuit 120 from the network unit 200 includes a command transmitted by the CPU 101 in the programmable logic controller 2 to the CPU 100 in the programmable logic controller 1.

The arithmetic unit 130 includes a CPU. The arithmetic unit 130 executes the various programs stored in the storage 110 to implement various functions of the CPU 100.

The network unit 200 includes, as hardware components, a storage 210 that stores various data sets, a communication I/F circuit 220 for communications, and an arithmetic unit 230 that controls the entire network unit 200. The storage 210 and the communication I/F circuit 220 are connected to the arithmetic unit 230 with an internal bus 290, and communicate with the arithmetic unit 230. Although the network unit 200 is described as an example, the network unit 201 in the programmable logic controller 2 also has the same configuration.

The storage 210 includes a volatile memory and a non-volatile memory, and stores various data sets and programs executed by the arithmetic unit 230 for implementing various functions of the network unit 200. The storage 210 temporarily stores data received from the CPU 100 and the network unit 201. The communication I/F circuit 220 transmits and receives data to and from the CPU 100 via the common bus 300. The communication I/F circuit 220 transmits data from the CPU 100 to the network unit 201 over the network 600. The communication I/F circuit 220 provides the data received from the network unit 201 over the network 600 to the CPU 100. The arithmetic unit 230 includes a CPU. The arithmetic unit 230 executes the programs stored in the storage 210 to implement various functions of the network unit 200.

Figure 2:
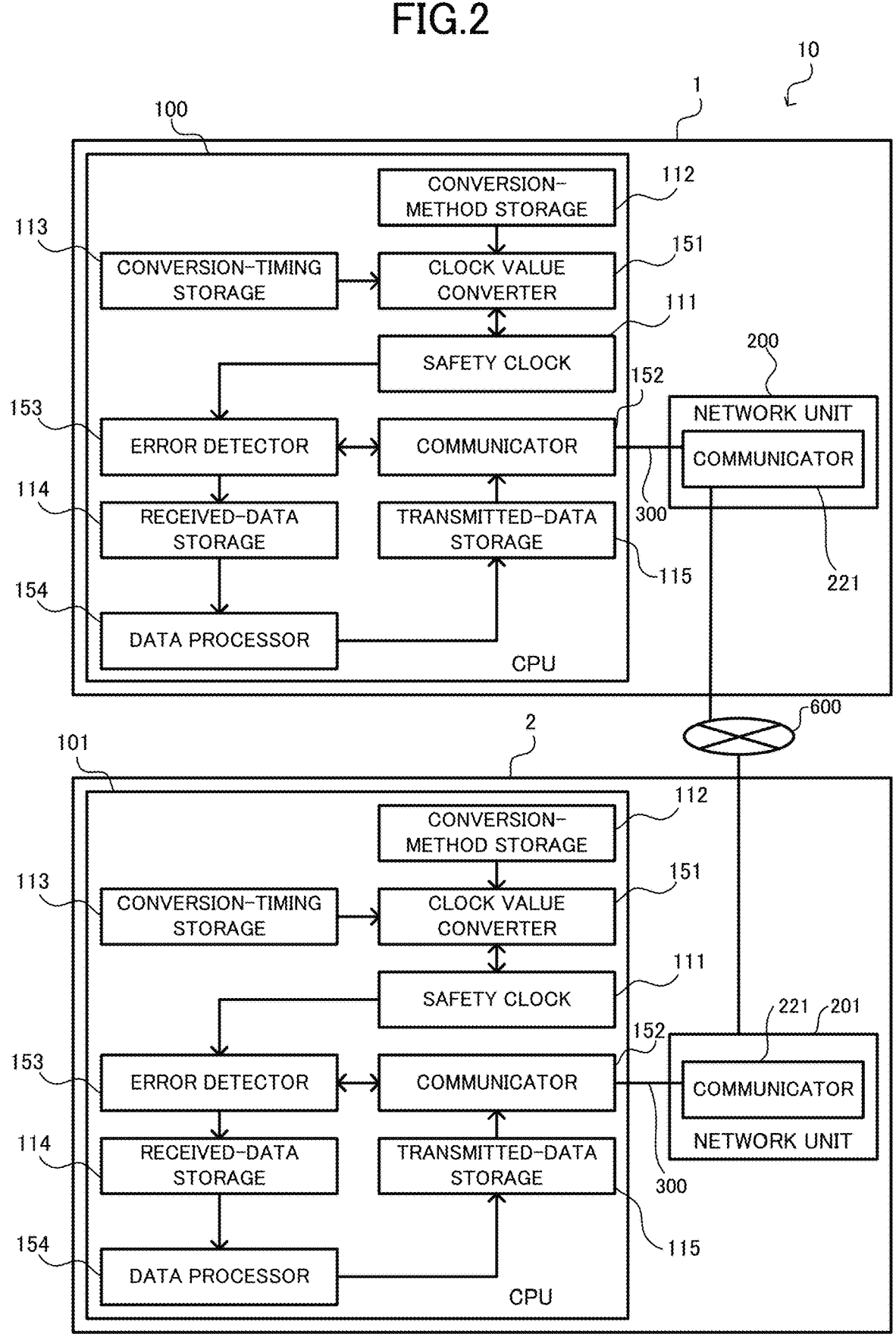
FIG. 2 is a functional block diagram of the communication system according to Embodiment 1.

As shown in FIG. 2, the CPU 100 includes, as functional units, a safety clock 111 for functional safety, a conversion-method storage 112 that stores a method for converting the value of a counter in the safety clock 111, a conversion-timing storage 113 that stores timing of converting the value of the counter in the safety clock 111, a received-data storage 114 that stores data received from the programmable logic controller 2, a transmitted-data storage 115 that stores data forwarded to the programmable logic controller 2, a clock value converter 151 that converts the value of the counter in the safety clock 111, a communicator 152 that generates data to be exchanged with another communication device, an error detector 153 that performs error detection of transmitted and received data, and a data processor 154 that performs various data processes.

The conversion-method storage 112 and the conversion-timing storage 113 in the CPU 100 are examples of first storage means. The clock value converter 151 in the CPU 100 is an example of first data conversion means. The communicator 152 in the CPU 100 is an example of first communication means. The error detector 153 in the CPU 100 is an example of first error detecting means.

Figure 3:
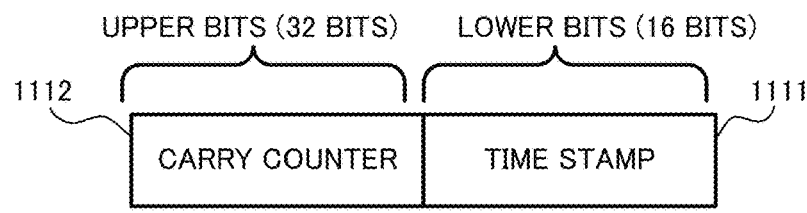
FIG. 3 is a schematic diagram of a safety clock according to Embodiment 1.

The safety clock 111 is a timing device including a clock generator circuit that generates a clock for each set period, and a counter that counts the generated clock signals. As shown in FIG. 3, the safety clock 111 includes two counters, that is, a time stamp 1111 and a carry counter 1112. The time stamp 1111 counts clock signals output by a clock generator circuit (not shown). The carry counter 1112 is incremented when the time stamp 1111 overflows. In the illustrated example, the count of the time stamp 1111 is stored in lower 16 bits. The count of the carry counter 1112 is stored in upper 32 bits.

The time stamp 1111 is designed to count a sufficiently long time. The time stamp 1111 can count a sufficiently long time and thus rarely overflows. Thus, the carry counter 1112 rarely changes the value from the initial value, and can show undispersed values. In Embodiment 1, the value of the carry counter 1112 is converted at predetermined timing with a predetermined method to cause the carry counter 1112 to show dispersed values.

The carry counter 1112 is incremented when the time stamp 1111 overflows. However, the value of the carry counter 1112 is converted at predetermined timing, and thus does not strictly represent the number of times the time stamp 1111 overflows. Conversion of the value of the carry counter 1112 will be described later. The safety clock 111 is implemented by the storage 110 and the arithmetic unit 130 shown in FIG. 1.

The safety clock 111 in the CPU 100 shown in FIG. 2 is an example of first clock means. The time stamp 1111 in the safety clock in the CPU 100 is an example of a first counter. The carry counter 1112 in the safety clock 111 in the CPU 100 is an example of a second counter.

The safety clock 111 in the CPU 101 has the same configuration as the safety clock 111 in the CPU 100. The clock generator circuit in the safety clock 111 in the CPU 101 (not shown) generates clocks at the same timing as the clock generator circuit in the safety clock 111 in the CPU 100. The initial values of the time stamp 1111 and the carry counter 1112 in the safety clock 111 in the CPU 101 are the same as the initial values of the time stamp 1111 and the carry counter 1112 in the safety clock 111 in the CPU 100. Similarly to the CPU 100, the CPU 101 converts the value of the carry counter 1112 at predetermined timing with a predetermined method to cause the carry counter 1112 to show dispersed values. Thus, the values of the time stamp 1111 and the carry counter 1112 in the safety clock 111 in the CPU 101 are controlled to constantly match the values of the time stamp 1111 and the carry counter 1112 in the safety clock 111 in the CPU 100.

The safety clock 111 in the CPU 101 is an example of second clock means. The time stamp 1111 in the safety clock 111 in the CPU 101 is an example of a third counter. The carry counter 1112 in the safety clock 111 in the CPU 101 is an example of a fourth counter.

For comparison, a counting method used by a known safety clock will be described first with reference to FIGS. 4A and 4B. In the example described below, the time stamp 11 and the carry counter 12 in the safety clock are set to the initial values of zero. The initial values of the time stamp 11 and the carry counter 12 in the safety clock are set by, for example, a manager of the programmable logic controllers 1 and 2.

Figure 4A:
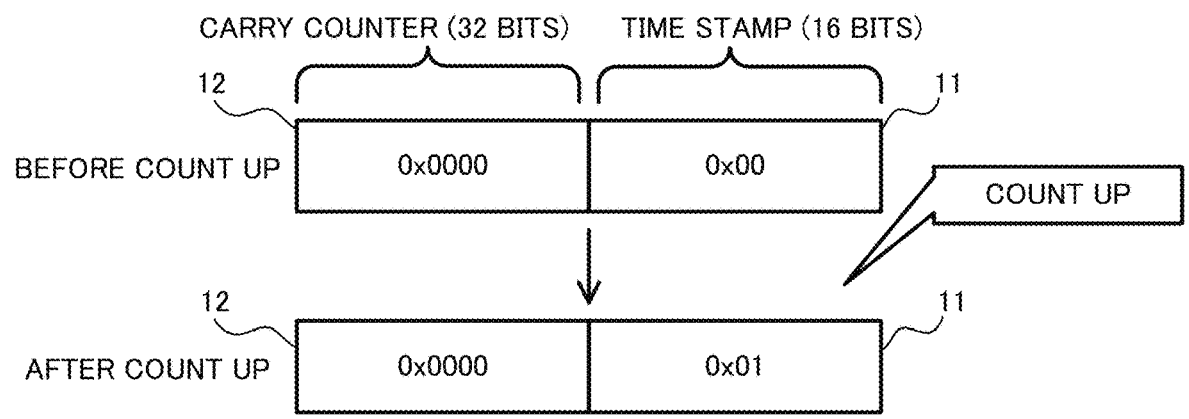
FIG. 4A is a diagram showing counting of a known safety clock.
Figure 4B:
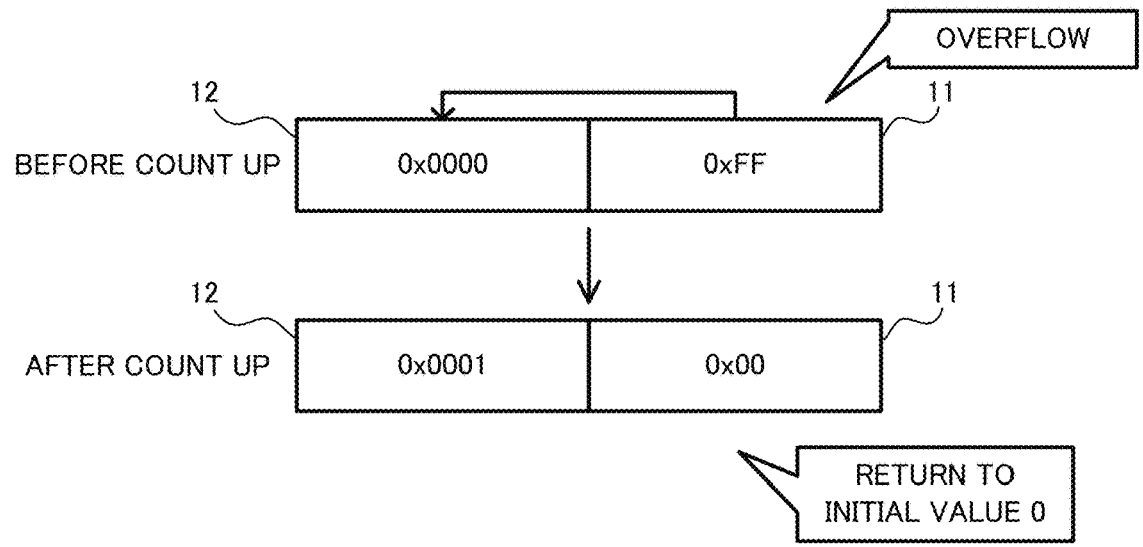
FIG. 4B is a diagram showing an overflow of a time stamp in a known safety clock.

As shown in FIG. 4A, the lower 16 bits of the time stamp 11 are incremented for each set period with a known method. As shown in FIG. 4B, when the value of the time stamp 11 exceeds the largest countable number, or when the time stamp 11 overflows, the carry counter 12 is incremented and the time stamp 11 is reset to the initial value of zero. The time stamp 11 is sequentially incremented, and when the time stamp 11 overflows again, the carry counter 12 is incremented. Thus with a known method, the carry counter 12 can have a value representing the number of times the time stamp 11 overflows. The values of the carry counter 12 and the time stamp 11 shown in FIGS. 4A and 4B are hexadecimal. The same applies hereafter.

Instead of zero, a manager of the programmable logic controllers 1 and 2 may set the carry counter 1112 to the calendar date as the initial value. For example, the initial value may be a value denoting April 10. The time stamp 1111 is similarly incremented for each set period, and the carry counter 12 is incremented when the time stamp 11 overflows.

The time stamp 11 is designed to count a sufficiently long time, and thus is expected to overflow rarely. Thus, the carry counter 12 is more likely to retain the initial value or have a value close to the initial value. In other words, the carry counter 12 is highly likely to have a value equal to or close to the initial value.

Figure 5A:
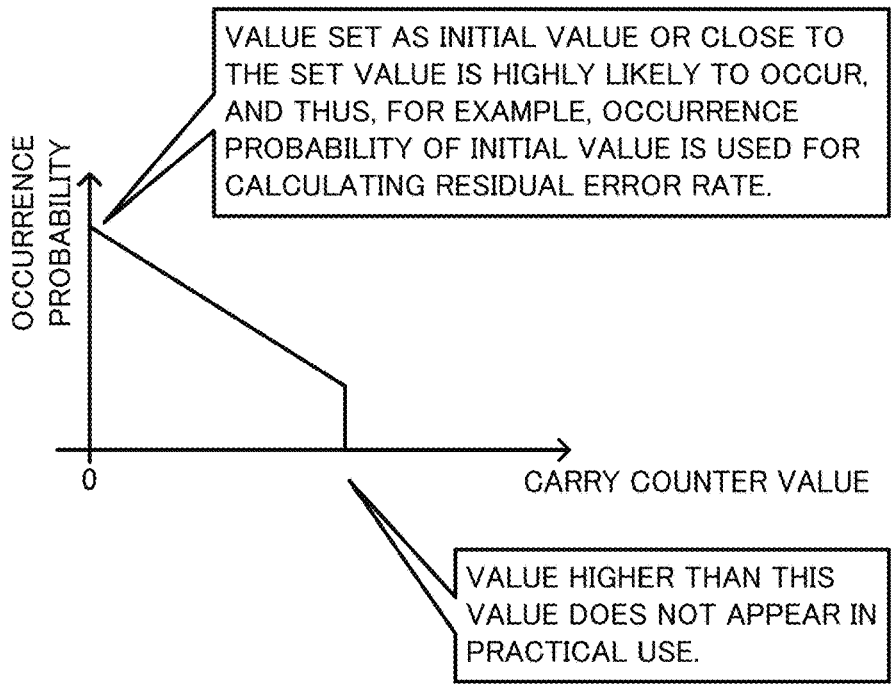
FIG. 5A is a graph showing the relationship between the value of a carry counter in a known safety clock and the occurrence probability of the value for the carry counter using zero as an initial value.
Figure 5B:
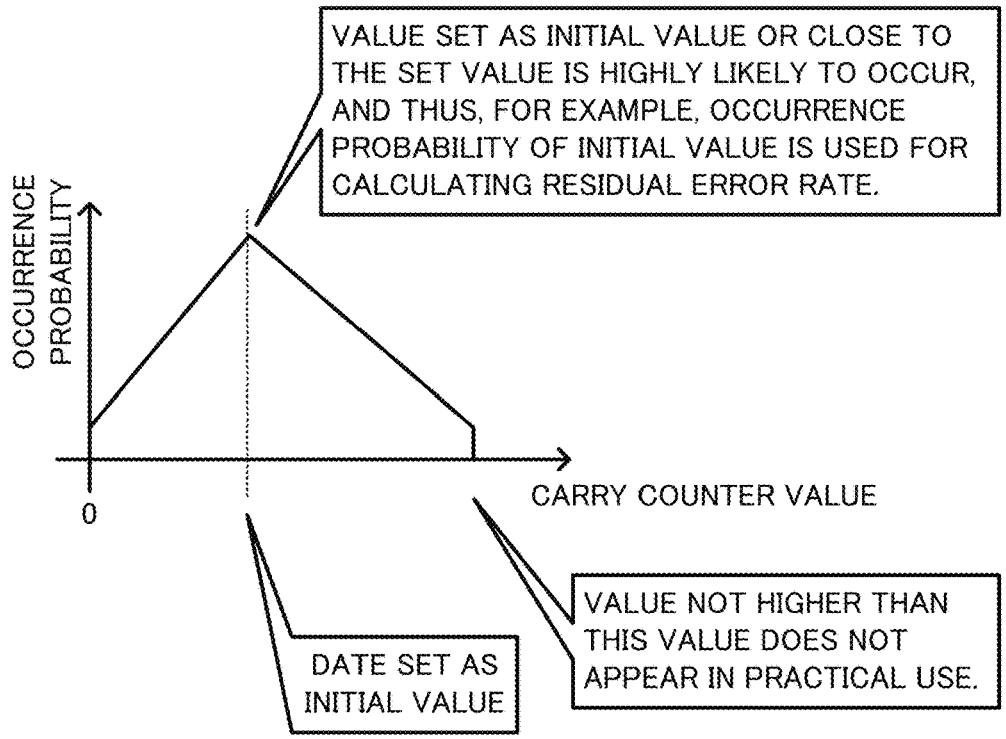
FIG. 5B is a graph showing the relationship between the value of the carry counter and the occurrence probability of the value for the carry counter using the calendar date as an initial value.

As shown in FIG. 5A, zero or a value close to zero highly frequently occurs as the value of the carry counter 12 when the carry counter 12 is set to zero as the initial value. The carry counter 12 is less frequently incremented, and the time stamp 11 and the carry counter 12 may be reset in response to, for example, restart of the device. This limits the values shown by the carry counter 12 in practical use. As shown in FIG. 5B, when the carry counter 12 is set to the current date as the initial value, the date set as the initial value or the value close to the set date highly frequently occurs as the value of the carry counter 12. Either when the carry counter 12 is set to zero or when the carry counter 12 is set to the calendar date as the initial value, the carry counter 12 can have undispersed values, as shown in FIGS. 5A and 5B.

In response to this circumstance, the CPU 100 in Embodiment 1 shifts one or more bits indicating the value of the carry counter 1112 in the safety clock 111 at set timing to convert the value of the carry counter 1112. This bit shift at set timing changes the value of the carry counter 1112 to a value different from the value before the conversion. The CPU 100 converts the value of the carry counter 1112 with a bit shift, and the carry counter 1112 is not sequentially incremented. This causes the carry counter 1112 to show dispersed values. The time stamp 1111 is sequentially incremented from the set initial value for each set period with a known method. When the time stamp 1111 overflows after the conversion with a bit shift, the carry counter 1112 is incremented from the value resulting from conversion. When the time stamp 1111 overflows before conversion with a bit shift, the carry counter 1112 is incremented from the set initial value. A specific method for converting the value of the carry counter 1112 will be described later.

The conversion-method storage 112 shown in FIG. 2 stores data representing a method for converting the value of the carry counter 1112 in the safety clock 111. For example, a manager of the programmable logic controllers 1 and 2 prestores data representing a method for converting the value of the carry counter 1112 in the safety clock 111 in the conversion-method storage 112. The conversion-method storage 112 is implemented by the storage 110. In Embodiment 1, as described above, the value of the carry counter 1112 in the safety clock 111 is converted by a bit shift. Thus, the conversion-method storage 112 stores information about the carry counter 1112 specifying one or more bits to be converted, indicating the shift direction, and indicating the number of bits to be shifted.

For example, as shown in FIG. 6, the carry counter 1112 in the safety clock 111 is set to the calendar date of April 1 as the initial value. More specifically, the counter is set to a value obtained by converting one-digit decimal values of 0, 4, 0, and 1 into eight-digit binary values. The conversion-method storage 112 stores, as a conversion method, cyclic rightward shifting of upper 24 bits per 8 bits. Cyclically shifting the upper 24 bits rightward per 8 bits rearranges the upper 24 bits of the carry counter 1112.

Figure 7:
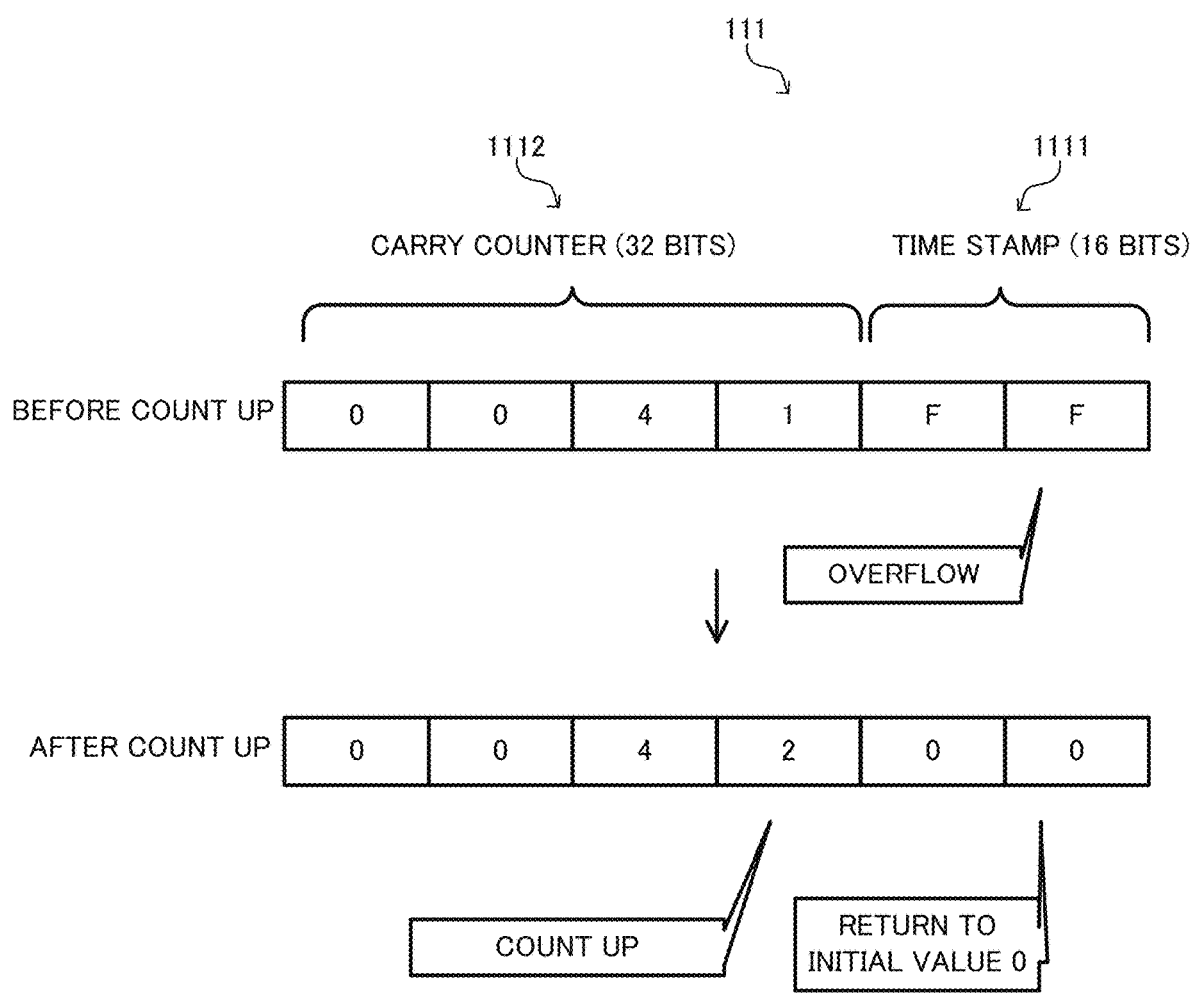
FIG. 7 is a diagram showing an overflow of the safety clock according to Embodiment 1.

For example, when the time stamp 1111 overflows in the state shown in FIG. 7, the carry counter 1112 is incremented.

The conversion-timing storage 113 stores data indicating timing at which the value in the carry counter 1112 in the safety clock 111 is converted. For example, the manager of the programmable logic controllers 1 and 2 prestores, in the conversion-timing storage 113, data indicating timing at which the value of the carry counter 1112 in the safety clock 111 is converted. The conversion-timing storage 113 is implemented by the storage 110 shown in FIG. 1. The conversion-timing storage 113 shown in FIG. 2 stores data indicating the timing independent of the set timing at which the time stamp 1111 is incremented.

The value of the carry counter 1112 may be converted at timing that may be, for example, each millisecond, or every predetermined number of times the time stamp 1111 in the safety clock 111 counts. The timing of conversion may be every time when the safety clock 111 overflows, or when the value of the set bit of the safety clock 111 is changed. In Embodiment 1, to eliminate the uneven dispersion of the values of the counter in the safety clock 111, the value of the carry counter 1112 may be converted in short cycles.

The received-data storage 114 stores data received by the network unit 200 from the network unit 201 and determined by the error detector 153 as having no error through detection. The data received by the network unit 200 from the network unit 201 includes, for example, a command from the programmable logic controller 2 to the programmable logic controller 1. The received-data storage 114 is implemented by the storage 110 shown in FIG. 1. Data stored in the received-data storage 114 shown in FIG. 2 is processed as appropriate by the data processor 154 (described later).

The transmitted-data storage 115 stores data to be transmitted to the programmable logic controller 2. The transmitted-data storage 115 is implemented by the storage 110 shown in FIG. 1. The data processor 154 (described later) writes transmission data into the transmitted-data storage 115 shown in FIG. 2.

The clock value converter 151 converts the value of the carry counter 1112 in the safety clock 111, using a method used by the conversion-method storage 112 to store data, at timing when the conversion-timing storage 113 stores data. The function of the clock value converter 151 is implemented by the arithmetic unit 130 shown in FIG. 1 executing the program 001.

The communicator 152 generates a transmission frame to be transmitted to the programmable logic controller 2. The transmission frame includes a header, a data body, and an error detecting code. The header includes address information. The data body includes data forwarded to the programmable logic controller 2 stored in the transmitted-data storage 115 and the value of the time stamp 1111 in the safety clock 111. The error detecting code is generated by the error detector 153 (described later). The communicator 152 transmits the generated transmission frame to the network unit 200 via the common bus 300. The communicator 152 receives data from the network unit 200 via the common bus 300. Data transmitted from the network unit 200 corresponds to data received by the network unit 200 from the network unit 201 in the programmable logic controller 2. The communicator 152 is implemented by the communication I/F circuit 120 and the arithmetic unit 130 shown in FIG. 1.

The error detector 153 shown in FIG. 2 generates a cyclic redundancy check (CRC) to be added to the transmission frame for transmission to the programmable logic controller 2. The error detector 153 performs error detection using a CRC added to the frame received from the programmable logic controller 2. In the present embodiment, the error detector 153 uses a CRC to perform an error check to determine whether data is broken over the transmission line. The function of the error detector 153 is implemented by the arithmetic unit 130 shown in FIG. 1 executing the program 001.

Figure 8:
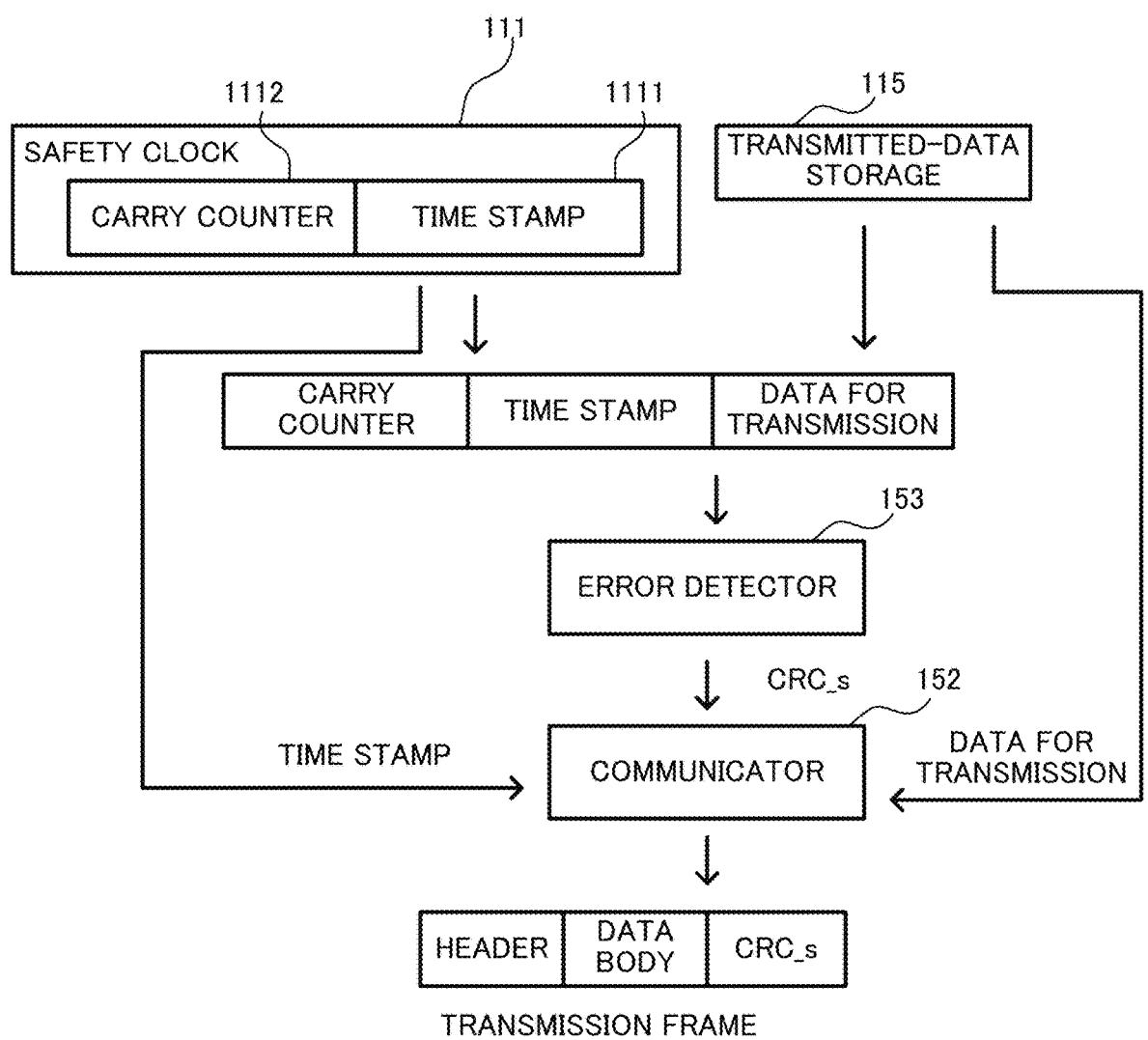
FIG. 8 is a diagram showing a method for generating a cyclic redundancy check (CRC) according to Embodiment 1.

More specifically, the error detector 153 shown in FIG. 2 calculates a CRC as an error detecting code added to the transmission frame for transmission to the network unit 201 by the network unit 200. In Embodiment 1, as shown in FIG. 8, the error detector 153 generates a CRC based on the data forwarded to the programmable logic controller 2 stored in the transmitted-data storage 115, and the values of the time stamp 1111 and the carry counter 1112 in the safety clock 111. The error detector 153 outputs the generated CRC to the communicator 152. Hereafter, the CRC generated by a transmitter may be referred to as a CRCs. The CRCs generated by the transmitter is an example of a first error detecting code.

Figure 9:
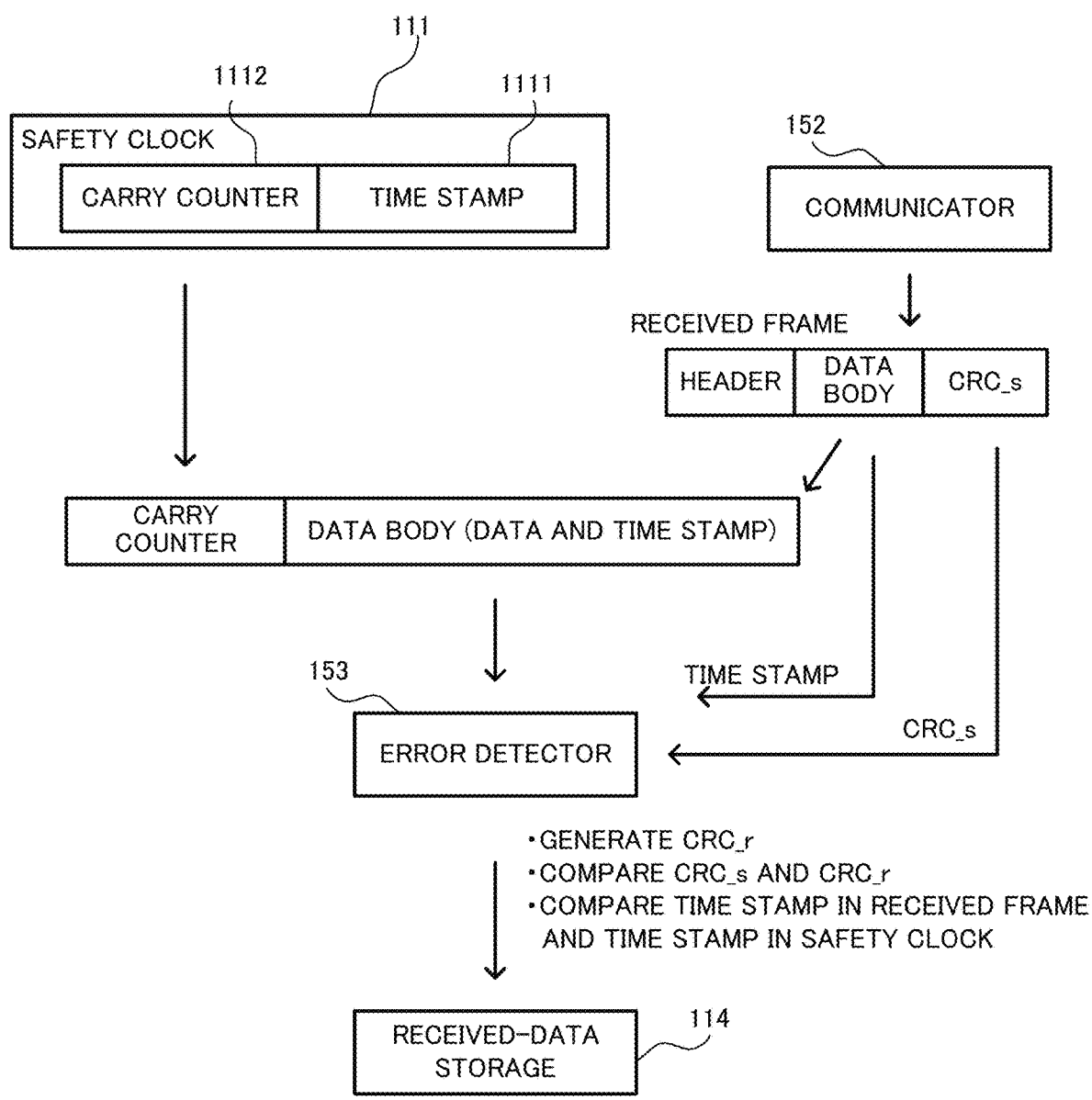
FIG. 9 is a diagram showing an error detection method according to Embodiment 1.

As shown in FIG. 9, the error detector 153 determines whether the CRCs added to the frame received by the network unit 200 from the network unit 201 matches the CRC calculated based on the received frame. As described above, the transmitter generates a CRCs based on transmission data and the values of the time stamp 1111 and the carry counter 1112 in the safety clock 111. The error detector 153 thus generates a CRC based on data included in the data body of the frame received by the communicator 152, the value of the time stamp 1111 included in the data body, and the value of the carry counter 1112 in the corresponding safety clock 111. Hereafter, a CRC generated by a receiver may be rephrased as a CRC r. The error detector 153 determines whether the generated CRC r matches the CRCs contained in the received frame. The CRC r generated by the receiver is an example of a second error detecting code.

When the CRC r and the CRCs do not match, the error detector 153 discards the received frame, because the data of the received frame is broken.

When the CRC r and the CRC s match, the error detector 153 determines whether the value of the time stamp 1111 contained in the data body of the received data indicates a specified time earlier than the current time indicated by the time stamp 1111 in the corresponding safety clock 111. More specifically, the error detector 153 determines whether the time obtained by adding a specified offset time to the value of the time stamp 1111 contained in the received data is earlier than the current time shown by the corresponding safety clock 111. This determines whether the received data has arrived within an expected time period.

When determining that the time obtained by adding a specified offset time to the value of the time stamp 1111 contained in the received data is earlier than the current time shown by the corresponding safety clock 111, the error detector 153 stores the data of the received frame into the received-data storage 114.

When determining that the time obtained by adding a specified offset time to the value of the time stamp 1111 contained in the received data is later than the current time shown by the corresponding safety clock 111, the error detector 153 discards the received frame, because the received frame does not arrive within an expected time period.

The data processor 154 stores data forwarded to the programmable logic controller 2 into the transmitted-data storage 115. The data processor 154 stores, into the transmitted-data storage 115, for example, a command to a controllable device connected to the programmable logic controller 2 as the data forwarded to the programmable logic controller 2. The data processor 154 performs appropriate processing on data stored in the received-data storage 114. When, for example, data stored in the data processor 154 is inspection data collected by the programmable logic controller 2, the data processor 154 performs statistical processing on the inspection data. The data processor 154 is implemented by the arithmetic unit 130 shown in FIG. 1.

The CPU 101 in the programmable logic controller 2 shown in FIG. 2 has the same configuration as the CPU 100.

The values of the safety clocks 111 are to match between the CPU 100 in the programmable logic controller 1 and the CPU 101 in the programmable logic controller 2. The conversion-method storage 112 in the CPU 101 thus stores data about the same conversion method as the method for the conversion-method storage 112 in the CPU 100. For example, a manager of the programmable logic controllers 1 and 2 stores data about the same conversion method as the method for the conversion-method storage 112 in the CPU 100 into the conversion-method storage 112 in the CPU 101. The conversion-timing storage 113 in the CPU 101 stores information about the same conversion timing as the timing for the conversion-timing storage 113 in the CPU 100. Thus, the CPU 101 in the programmable logic controller 2 also converts the value of the carry counter in the safety clock 111 at the same timing and with the same method as for the CPU 100 in the programmable logic controller 1. Thus, the values of the safety clocks 111 in the CPUs 100 and 101 constantly match each other. Each of the CPUs 100 and 101 converts the value of the carry counter 1112 in the corresponding safety clock 111 with a bit shift. Thus, the value of the carry counter 1112 in each of the CPUs 100 and 101 is not sequentially incremented. The values shown by the carry counter 1112 can thus be dispersed. The safety clocks 111 in the programmable logic controllers 1 and 2 are set to the same initial value.

The conversion-method storage 112 and the conversion-timing storage 113 in the CPU 101 are examples of second storage means. The clock value converter 151 in the CPU 101 is an example of second data conversion means. The communicator 152 in the CPU 101 is an example of second communication means. The error detector 153 in the CPU 101 is an example of second error detecting means.

The network unit 200 includes, as a functional unit, a communicator 221 that communicates with the CPU 100 via a common bus, and communicates with the network unit 201.

The communicator 221 transmits and receives data to and from the CPU 100 via the common bus 300. The communicator 221 communicates with the network unit 201 over the network 600. For example, the communicator 221 receives data forwarded to the programmable logic controller 2 from the CPU 100 via the common bus 300. The communicator 221 transmits the received data to the network unit 201 over the network 600. The communicator 221 receives data from the network unit 201 over the network 600. The communicator 221 transmits the received data to the CPU 100 via the common bus 300. The communicator 221 is implemented by the storage 210, the communication I/F circuit 220, and the arithmetic unit 230 shown in FIG. 1.

The network 600 is, for example, a local area network (LAN) of Ethernet (registered trademark).

Figure 10:
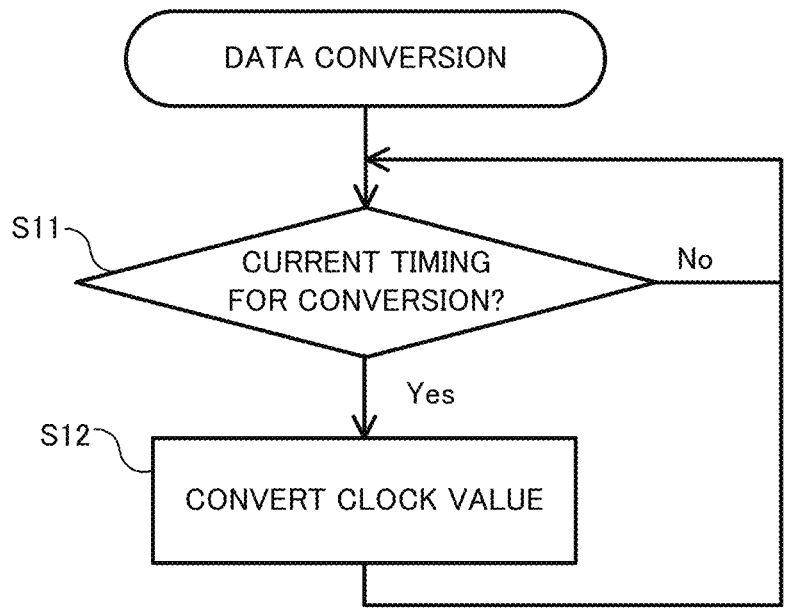
FIG. 10 is a flowchart of data conversion according to Embodiment 1.

The conversion performed by the clock value converter 151 shown in FIG. 2 will now be described. As shown in FIG. 10, the clock value converter 151 determines whether the current timing is for the conversion stored in the conversion-timing storage 113 (step S11). When determining that the current timing is for performing the conversion (Yes in step S11), the clock value converter 151 converts the clock value (step S12).

In one example, the conversion-method storage 112 stores, as a conversion method, cyclic rightward shifting of upper 24 bits per 8 bits. As shown in FIG. 6, the clock value converter 151 cyclically shifts the upper 24 bits of the value of the counter in the safety clock 111 rightward per 8 bits. Thus, the value of the carry counter 1112 in the safety clock 111 is rewritten to the value resulting from the conversion. As shown in FIG. 10, the clock value converter 151 again advances to the processing in step S11.

When determining, in step S11, that the current timing is not for performing the conversion (No in step S11), the clock value converter 151 stands by until the timing for the conversion.

The CPU 101 converts the value of the carry counter 1112 in the safety clock 111 at the same timing and with the same method as for the CPU 100. Thus, the values of the carry counter 1112 in the safety clock 111 in the CPU 100 and the values of the carry counter 1112 in the safety clock 111 in the CPU 101 are dispersed similarly.

The above describes the configuration according to Embodiment 1. In Embodiment 1, the values of the carry counter 1112 among the counters in the safety clock 111 are replaced with bit-shifted values. Converting the values of the counter in the safety clock 111 within a set range can cause the counter in the safety clock 111 to show values at dispersed frequencies. However, the values of the counter in the safety clock 111 may be converted with another method.

Embodiment 2

In Embodiment 2, the values of the safety clock are converted by replacing the values of the counter in the safety clock 111 with random numbers generated with a predetermined generation method. Embodiment 2 will be described focusing on its differences from Embodiment 1.

Figure 11:
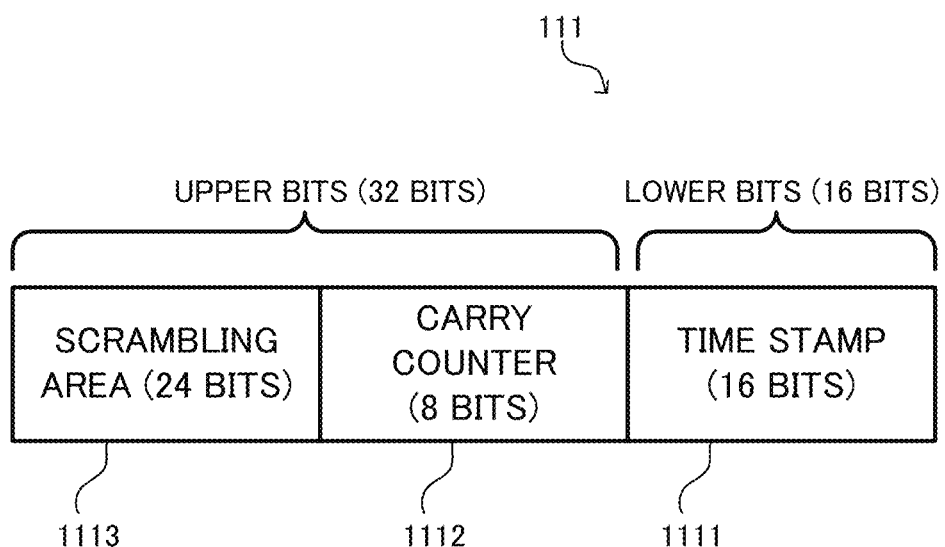
FIG. 11 is a schematic diagram of a safety clock according to Embodiment 2.

Similarly to Embodiment 1, the safety clock 111 shown in FIG. 2 includes a clock generator circuit that generates a clock per set time period, and a counter that counts the generated clock signals. As shown in FIG. 11, the safety clock 111 according to Embodiment 2 includes two counters, that is, the time stamp 1111 and the carry counter 1112. The time stamp 1111 counts the clock signals output by the clock generator circuit (not shown). The carry counter 1112 counts overflows of the time stamp 1111. The safety clock 111 also includes a scrambling area 1113, in which the values are rewritten at set timing. FIG. 11 is a schematic diagram of the safety clock 111 according to Embodiment 2 showing a bit sequence held by the counters. Embodiment 2 is the same as Embodiment 1 shown in FIG. 3 in that the lower 16 bits are allocated to the area of the time stamp 1111. Eight bits of the upper 32 bits are allocated to the area of the carry counter 1112. The remaining 24 bits of the upper 32 bits are allocated to the scrambling area 1113. In Embodiment 2, the value of the scrambling area 1113 is replaced with the generated random number at predetermined timing.

Figure 12:
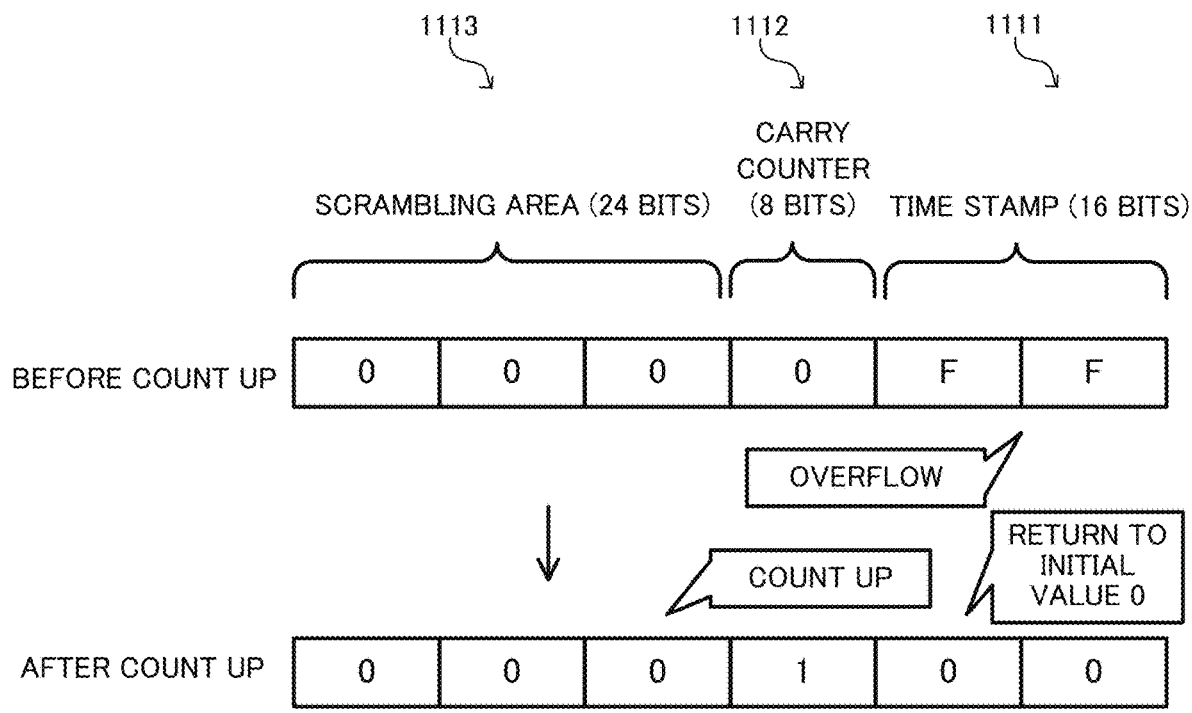
FIG. 12 is a diagram showing an overflow of the safety clock according to Embodiment 2.

Although Embodiment 2 is different from Embodiment 1 in the number of bits allocated to the carry counter 1112, the carry counter 1112 is incremented when the time stamp 1111 overflows as shown in FIG. 12.

Figure 13:
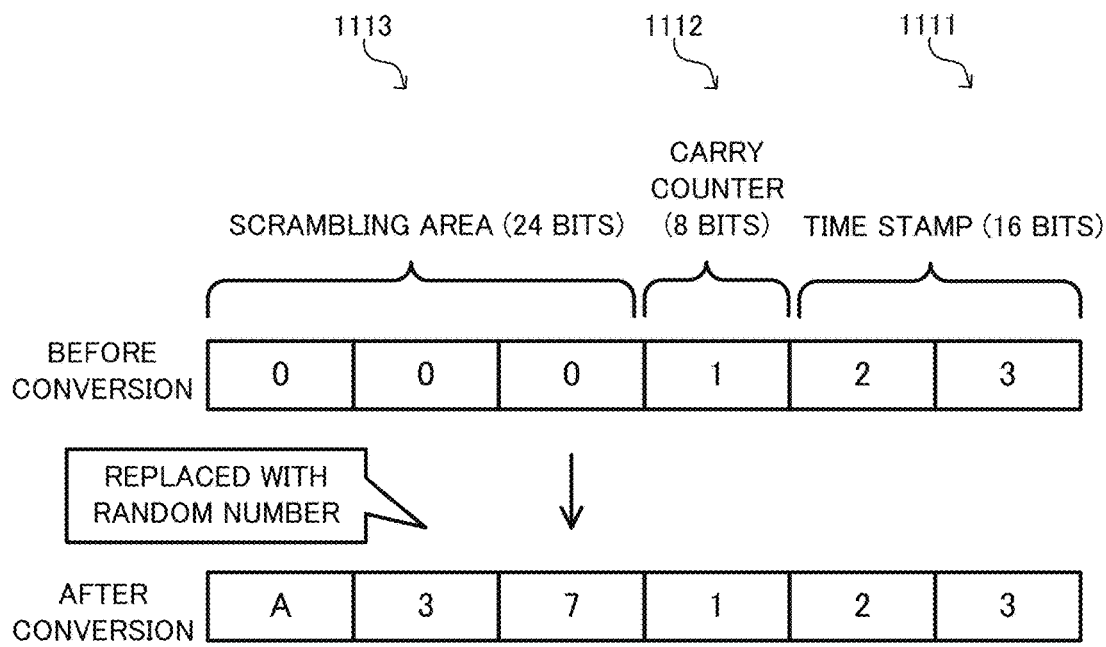
FIG. 13 is a diagram showing a method of data conversion through a bit shift performed by the safety clock according to Embodiment 2.

The conversion-method storage 112 shown in FIG. 2 defines a conversion range of the scrambling area 1113 shown in FIG. 11, a random number generation algorithm, and a seed for generating random numbers. For example, the conversion-method storage 112 defines the upper 24 bits as the conversion range, an algorithm 2000 as the random number generation algorithm to be used, and a seed 3000 as the seed to be used. When the specified range is replaced with the generated random number, for example, the value of the scrambling area 1113 in the safety clock 111 is converted in the manner shown in FIG. 13.

The values of the counters are to match each other in the safety clocks 111 in the CPUs 100 and 101. Thus, the random number generation algorithm stored in the conversion-method storage 112 shown in FIG. 2 is to enable the CPUs 100 and 101 to obtain the same value using the same seed.

In Embodiment 2, to eliminate the uneven dispersion of the values of the counter in the safety clock 111, a selected random number generation algorithm may have equal occurrence rates of 0 and 1 in the generated random numbers formed in a bit sequence containing 0 and 1, and may pass an evaluation test for a random number generation algorithm.

The conversion-timing storage 113 stores the timing at which the value of the scrambling area 1113 in the safety clock 111 shown in FIG. 11 is converted within a specified range.

The clock value converter 151 generates random numbers at the timing stored in the conversion-timing storage 113 using the random number generation algorithm and the seed specified in the conversion-method storage 112. The clock value converter 151 replaces, in the scrambling area 1113, the value within the range specified in the conversion-method storage 112 with a bit sequence including 0 and 1, representing the generated random number. Thus, the value of the scrambling area 1113 in the safety clock 111 is converted. In Embodiment 2, the values shown by the carry counter 1112 in the safety clock 111 can also be dispersed. The conversion flow of the clock value converter 151 in Embodiment 2 is similar to that in Embodiment 1 shown in FIG. 10.

Some random number generation algorithms may involve initialization. To use a random number generation algorithm specified by the conversion-method storage 112 involving initialization, the clock value converter 151 performs initialization before the timing specified by the conversion-timing storage 113.

Embodiment 3

Generating random numbers in Embodiment 2 more effectively reduces the uneven dispersion of the values of the safety clock 111 than using bit shifts in Embodiment 1. However, the conversion method with random number generation has a higher processing load on the CPUs 100 and 101. Due to the processing load, the conversion using bit shifts may be used depending on the throughput of the CPUs 100 and 101. In this manner, each of the CPUs may use the conversion method with bit shifts or random number generation depending on the throughput.

In Embodiments 1 and 2, each of the CPUs 100 and 101 stores the method for converting the value of the counter in the safety clock 111 in the conversion-method storage 112, and stores the conversion timing into the conversion-timing storage 113. However, the use of more CPUs 100 will increase time and effort for a manager to set the conversion method and the conversion timing for each CPU 100.

Thus, in Embodiment 3, a master communication device that manages conversion of the value of the counter in the safety clock and a slave communication device for which the conversion of the value of the counter in the safety clock is managed are predefined. The master communication device may then notify the conversion method and the conversion timing of the value of the safety clock to the slave communication device.

Figure 14:
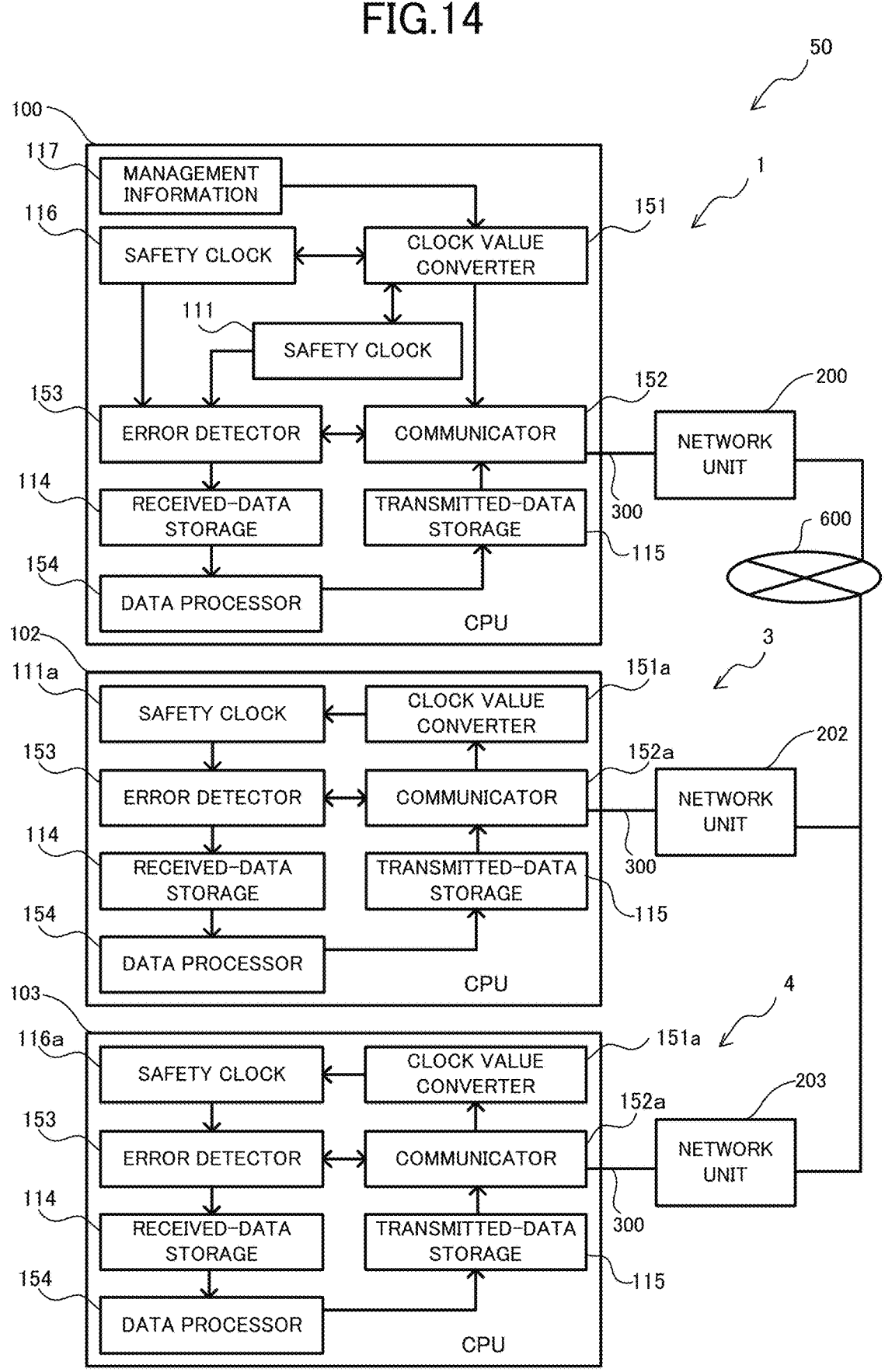
FIG. 14 is a schematic diagram of a communication system according to Embodiment 3.

FIG. 14 is a schematic diagram of a communication system 50 according to Embodiment 3. The programmable logic controller 1 is a master communication device. Programmable logic controllers 3 and 4 are slave communication devices. The programmable logic controllers 1, 3, and 4 can communicate with one another over the network 600. Embodiment 3 will be described focusing on its differences from Embodiments 1 and 2.

In Embodiment 3, the CPU 100 in the programmable logic controller 1 includes the safety clock 111 for communication with the programmable logic controller 3 and a safety clock 116 for communication with the programmable logic controller 4.

The safety clock 111 has the configuration shown in FIG. 3. The safety clock 116 has the configuration shown in FIG. 11. The CPU 100 converts the value of the safety clock 111 with a bit shift, and replaces the value of the safety clock 116 with a random number for conversion.

In Embodiment 3, the CPU 100 includes management information 117 instead of the conversion-method storage 112 and the conversion-timing storage 113 in Embodiments 1 and 2. The management information 117 stores information indicating the conversion method and the conversion timing for the value of the safety clock notified by the master programmable logic controller 1 to the slave programmable logic controllers 3 and 4. As shown in FIG. 15, the management information 117 defines information for identifying a slave programmable logic controller, information for identifying the safety clock included in the slave programmable logic controller, information indicating the conversion method for the value of the safety clock, and information indicating the conversion timing.

The safety clock 111 and a safety clock 111a included in a CPU 102 in the programmable logic controller 3 (described later) are to have the same value. The safety clock 116 and a safety clock 116a included in a CPU 103 in the programmable logic controller 4 (described later) are to have the same value. Thus, the management information 117 stores information about the conversion method and the conversion timing for the safety clock 111a in the programmable logic controller 3 similar to those for the safety clock 111. The management information 117 stores the information about the conversion method and the conversion timing for the safety clock 116a in the programmable logic controller 4 similar to those for the safety clock 116. The CPU 100 prestores information indicating the correspondence between the safety clocks 111 and 111a and the correspondence between the safety clocks 116 and 116a. The management information 117 is implemented by the storage 110 shown in FIG. 1. The management information 117 is an example of first storage means.

The clock value converter 151 shown in FIG. 14 converts the values of the safety clocks 111 and 116 in accordance with the conversion methods and the conversion timing defined in the management information 117.

The clock value converter 151 also notifies the slave programmable logic controllers specified by the management information 117 of the conversion methods and the conversion timing defined in the management information 117. The clock value converter 151 outputs, to the communicator 152, information indicating the conversion method and the conversion timing defined for each of the slave programmable logic controllers. Thus, the communicator 152 generates a frame including a specific command representing a data conversion command, and information indicating the conversion method and the conversion timing, and transmits the generated frame to the network unit 200. The network unit 200 transmits the frame transmitted from the CPU 100 to network units 202 and 203. The clock value converter 151 is an example of notification means.

The CPU 102 in one slave programmable logic controller 3 managed by the programmable logic controller 1 includes the safety clock 111a. Similarly to the safety clock 111, the safety clock 111a has the configuration shown in FIG. 3. The safety clock 111a is controlled to have the same value as the safety clock 111 in the CPU 100.

A clock value converter 151a in the CPU 102 converts the value of the safety clock 111a at the conversion timing with the conversion method notified from the CPU 100. When the network unit 202 receives the frame including a specific command from the network unit 200, a communicator 152a provides information indicating the conversion method and the conversion timing included in the frame to the clock value converter 151a. The CPU 102 includes neither the conversion-method storage 112 nor the conversion-timing storage 113 included in the CPUs 100 and 101 according to Embodiment 1.

The CPU 103 in the other slave programmable logic controller 4 managed by the programmable logic controller 1 includes the safety clock 116a.

Similarly to the safety clock 116, the safety clock 116a has the configuration shown in FIG. 11. The safety clock 116a is controlled to have the same value as the safety clock 116 in the CPU 100. The clock value converter 151a and the communicator 152a in the CPU 103 have the same configuration as the CPU 102. Similarly to the CPU 102, the CPU 103 includes neither the conversion-method storage 112 nor the conversion-timing storage 113 according to Embodiment 1.

The components of the CPUs 102 and 103 with the same reference signs as the CPUs 100 and 101 according to Embodiments 1 and 2 are substantially the same as those in Embodiments 1 and 2 unless otherwise particularly noted in Embodiment 3.

Figure 16:
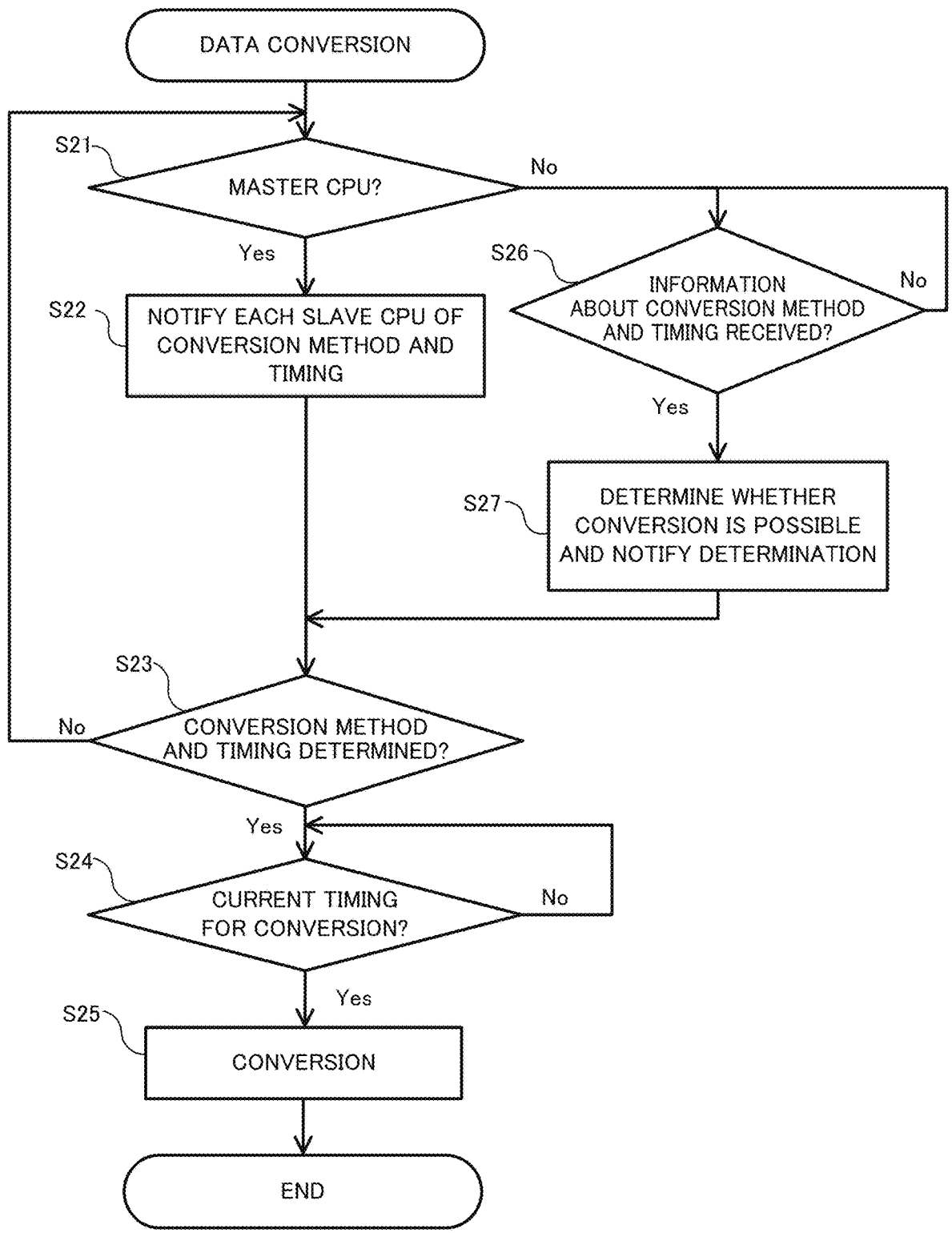
FIG. 16 is a flowchart of data conversion according to Embodiment 3.

As shown in FIG. 16, the CPUs 100, 102, and 103 having the above configuration perform data conversion.

The data conversion performed in the CPU 100 will be described first. The CPU 100, serving as a master (Yes in step S21), notifies each of the CPUs 102 and 103 of the conversion method and the conversion timing defined in the management information 117 (step S22). When receiving a response from each of the CPUs 102 and 103 indicating that they can perform conversion, the CPU 100 determines that the conversion method and the conversion timing have been determined (Yes in step S23) and advances to the next processing step. In step S24, when determining that the current timing is for performing the conversion (Yes in step S24), the CPU 100 converts the values of the safety clocks 111 and 116 allocated to the CPUs 102 and 103 (step S25). The processing is performed by the CPU 100. The CPU 100 converts the value of the safety clock for either or both the CPUs 102 and 103 that have responded that they can perform conversion in step S23. When receiving no response that they can perform conversion or receiving a response that they cannot perform conversion in step S23 from the CPUs 102 and 103, the CPU 100 determines that the conversion method and the conversion timing have not been determined (No in step S23), and again returns to the processing in step S21.

The data conversion in one slave, or in the slave CPU 102 will be described. The CPU 102 is not a master CPU (No in step S21), and determines whether the CPU 102 has received information about the data conversion method and the conversion timing from the CPU 100 (step S26). When receiving the information (Yes in step S26), the CPU 102 further determines whether the CPU 102 can perform conversion and notifies the CPU 100 of the determination result (step S27). The CPU 102 determines that the CPU 102 cannot perform conversion when, for example, the specified conversion interval is too short for the CPU 102 due to the processing load, or when the CPU 102 does not include a program for a random number generation algorithm. When determining that the CPU 102 can perform conversion, the conversion method and the conversion timing have been determined (Yes in step S23), and the CPU 102 thus performs the processing in step S24 and subsequent steps to convert the value of the safety clock 111a. The other slave, or the slave CPU 103 also performs the same processing as the CPU 102.

Embodiment 4

In Embodiment 3, the CPU 100 includes two safety clocks 111 and 116. The safety clocks 111 and 116 are used to determine whether data has arrived within an expected time period, and are expected to measure time with high precision. The CPU 100 including high-precision timing devices for the safety clocks 111 and 116 is thus costly.

In Embodiment 4, the CPU 100, serving as a master communication device, includes a single safety clock 111 and manages data conversion of the safety clocks in the slave CPUs 102 and 103.

Figure 17:
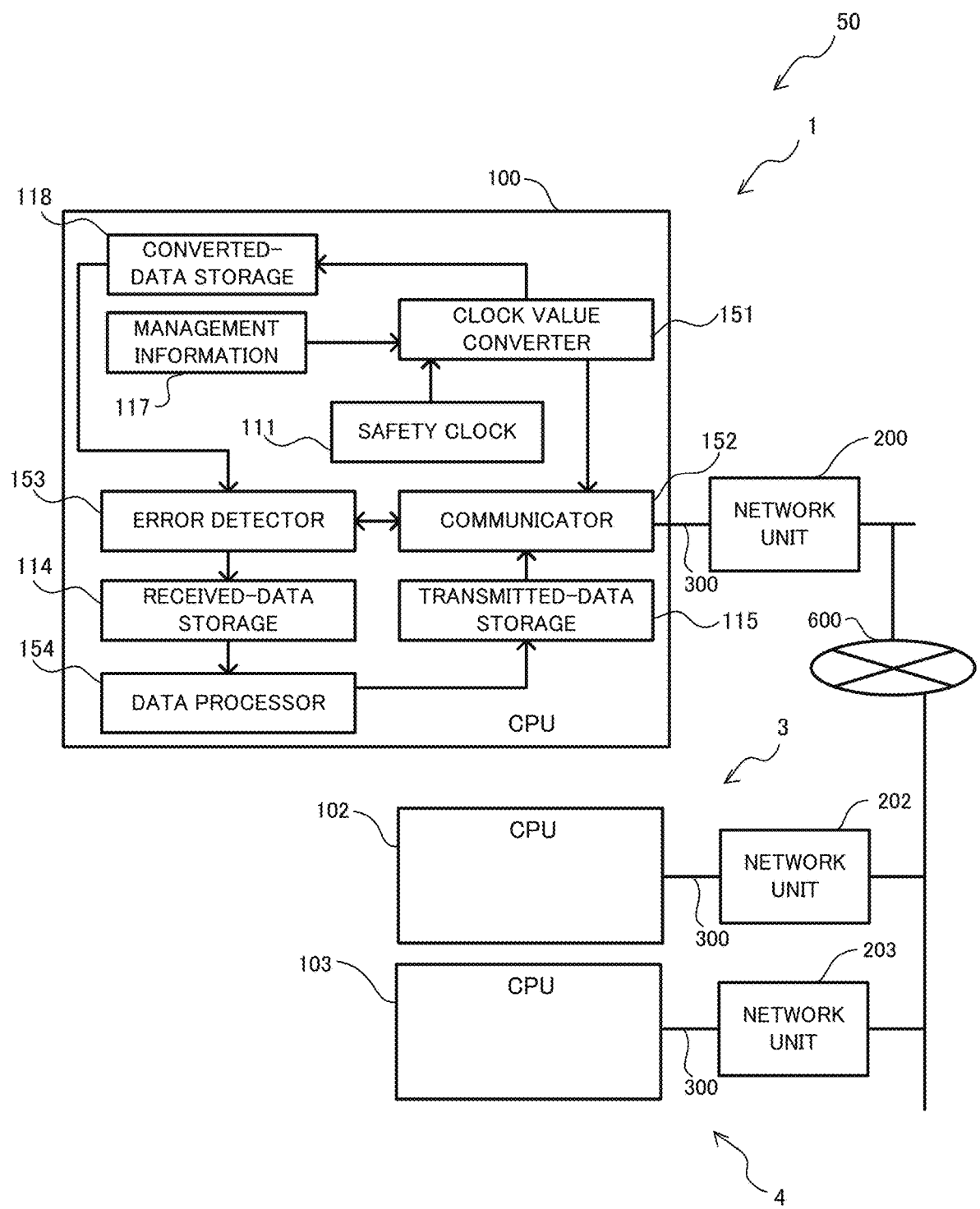
FIG. 17 is a schematic diagram of a communication system according to Embodiment 4.

Unlike in Embodiment 3, a CPU 100 in Embodiment 4 includes a single safety clock 111 as shown in FIG. 17. Also in Embodiment 4, the CPU 100 includes the management information 117 shown in FIG. 15.

The clock value converter 151 converts the value of the safety clock 111 at the timing and with the conversion method stored in the management information 117 shown in FIG. 15, and stores the obtained value into a converted-data storage 118. To manage the CPUs 102 and 103, the CPU 100 stores the values resulting from data conversion for the respective safety clocks into the converted-data storage 118. The converted-data storage 118 holds the same value as the value of the safety clock 111a in the CPU 102, and the same value as the value of the safety clock 116a in the CPU 103.

Figure 18:
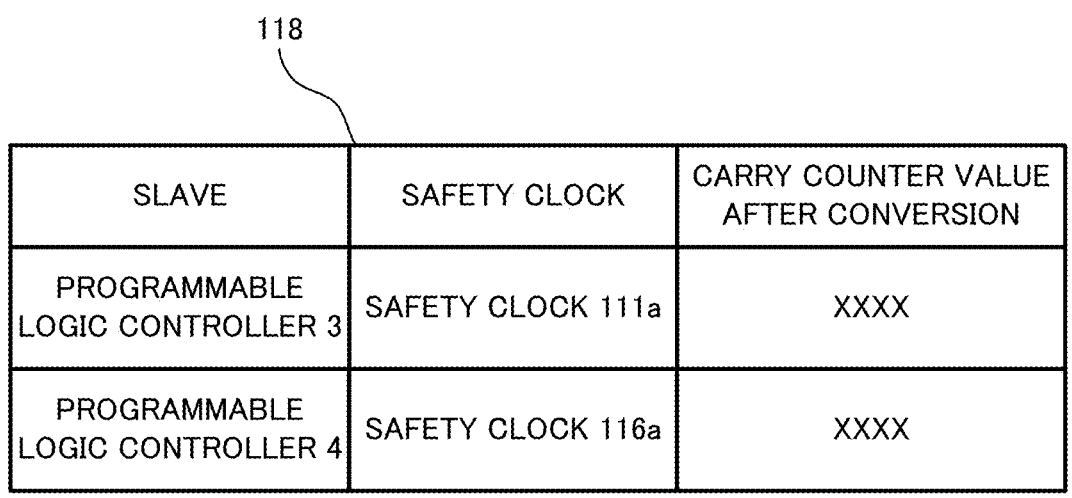
FIG. 18 is a table showing example data stored in a converted-data storage according to Embodiment 4.

More specifically, the clock value converter 151 converts the value of the safety clock 111 at the same timing as the conversion timing for the safety clock 111a in the CPU 102 with the same conversion method as for the safety clock 111a. As shown in FIG. 18, the clock value converter 151 stores the obtained value into the converted-data storage 118 together with information identifying the slave CPUs and the safety clocks in the slave CPUs. The CPU 102 also converts the value of the safety clock 111a at the same conversion timing as for the CPU 100 with the same conversion method as for the CPU 100. Thus, the value stored in the converted-data storage 118 matches the value of the safety clock 111a in the CPU 102.

The clock value converter 151 converts the value of the safety clock 111 at the same timing as the conversion timing for the safety clock 116a in the CPU 103 with the same conversion method as for the safety clock 116a, and stores the obtained value into the converted-data storage 118. The CPU 103 converts the value of the safety clock 116a at the same conversion timing as for the CPU 100 with the same conversion method as for the CPU 100. Thus, the value stored in the converted-data storage 118 matches the value of the safety clock 116a in the CPU 103.

For communication with the programmable logic controllers 3 and 4, the error detector 153 generates CRCs and detects errors using, instead of the value of the carry counter 1112 in the safety clock 111, the value resulting from conversion of the carry counter 1112 stored in the converted-data storage 118 and associated with the communication counterpart. The above describes configuration according to Embodiment 4.

As described above, in Embodiments 1 to 4, the value of the safety clock in the CPU 100 within a specified range and the values of the safety clocks in the CPUs 101, 102, and 103 with which the CPU 100 communicates within a specified range are replaced with other values at the same timing with the same method. Thus, the values of the safety clocks obtained after replacement are matched, and the uneven dispersion of the values of the safety clocks can be reduced. Thus, the residual error rate can be reduced in error detection of the values of the safety clock.

In Embodiment 1, the values of the carry counter 1112 are replaced using a bit shift. Thus, the residual error rate can be reduced without increasing the load on the CPU 100.

In Embodiment 2, the values of the carry counter 1112 are replaced with generated random numbers. This method can further cause the safety clock 111 to show more dispersed values than the method including a bit shift, and thus more effectively reduce the residual error rate.

In Embodiment 3, the data conversion method and the timing are shared through communication without being set for each of the communication devices. This structure enables selection of a data conversion method appropriate for the throughput of a master and a slave. For example, in communications with a communication device with low throughput, a method with a bit shift may be used instead of a method including random number generation including a high load. Thus, the configuration according to any of the above embodiments may be used for a known communication device.

In Embodiment 4, the value of the safety clock indicates, for example, the time dated on a calendar without the value of the carry counter being directly rewritten. Thus, the value of the safety clock can be used also for other purposes, such as for checking whether data arrives from a communication device to another communication device within an expected time. The master simply includes a single timing device with precision for use as a safety clock. The cost can thus be reduced more than a master including multiple safety clocks.

In Embodiments 1 to 4, the programmable logic controllers 1 to 4 communicate with one another, but this is not limiting. For example, the programmable logic controller 1 alone may transmit data, and the programmable logic controllers 2 to 4 may simply receive data. In this case, the transmitter programmable logic controller 1 generates an error detecting code, and transmits a frame including the error detecting code and a time stamp of the corresponding safety clock to the other programmable logic controllers. Each of the receiver programmable logic controllers 2 to 4 may generate an error detecting code based on the time stamp received from the programmable logic controller 1 and the carry counter in the corresponding safety clock, and may determine whether the generated error detecting code and the error detecting code received from the programmable logic controller 1 match each other.

In Embodiments 1 to 4, the CPU includes a safety clock and converts the value of the safety clock. Instead of the CPU, a network unit may perform the conversion.

Examples of a recording medium that records programs relating to the above data conversion include non-transitory computer-readable recording media such as a magnetic disk, an optical disc, a magneto-optical disc, a flash memory, a semiconductor memory, and a magnetic tape.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

001 Program
1, 2, 3, 4 Programmable logic controller
10, 50 Communication system
11, 1111 Time stamp
12, 1112 Carry counter
100, 101, 102, 103 CPU
110, 210 Storage
111, 111a, 116, 116a Safety clock
112 Conversion-method storage
113 Conversion-timing storage
114 Received-data storage
115 Transmitted-data storage
117 Management information
118 Converted-data storage
120, 220 Communication I/F circuit
130, 230 Arithmetic unit
151, 151a Clock value converter
152, 152a, 221 Communicator
154 Data processor
153 Error detector
190, 290 Internal bus
200, 201, 202, 203 Network unit
300 Common bus
600 Network
1113 Scrambling area
2000 Algorithm
3000 Seed

The invention claimed is:

1. A communication system, comprising:
a first communication device including processing circuitry; and
a second communication device including processing circuitry, the first communication device and the second communication device being configured to communicate with each other,
wherein the processing circuitry of the first communication device includes
a first clock including a first counter to count an elapsed time, and a second counter to count an overflow of the first counter,
a first data converter to replace a value of the second counter with a value generated at predetermined timing with a predetermined method to cause the second counter to show dispersed values,
a first error detector to generate a first error detecting code based on a value of the first counter and the value of the second counter, and
a first communicator to generate a frame and transmit the generated frame to the second communication device, the frame including data to be forwarded to the second communication device, and the value of the first counter and the first error detecting code added to the data, and
the processing circuitry of the second communication device includes
a second clock including a third counter to count an elapsed time, and a fourth counter to count an overflow of the third counter,
a second data converter to replace a value of the fourth counter with a value generated at the predetermined timing with the predetermined method to cause the fourth counter to show dispersed values,
a second communicator to receive the frame from the first communication device, and
a second error detector to generate a second error detecting code based on the value of the first counter included in the frame and the value of the fourth counter in the second clock, and determine whether the generated second error detecting code satisfies a condition set for the first error detecting code included in the frame.

2. The communication system according to claim 1, wherein:
the second counter has a same initial value as the fourth counter.

3. The communication system according to claim 1, wherein:
the first data converter replaces a value of the second counter within a specified range with a value shifted by a specified number of bits in a specified direction, and
the second data converter replaces a value of the fourth counter with a same method as used by the first data converter.

4. The communication system according to claim 1, wherein:
the first data converter replaces a value of the second counter within a specified range with a random number generated with a specified generation method, and
the second data converter replaces a value of the fourth counter with a same method as used by the first data converter.

5. The communication system according to claim 1, wherein:
the first error detector in the first communication device generates the first error detecting code based on the data to be forwarded to the second communication device, the value of the first counter, and the value of the second counter, and
the second error detector in the second communication device generates the second error detecting code based on the data forwarded to the second communication device included in the frame, the value of the first counter included in the frame, and the value of the fourth counter in the second clock.

6. The communication system according to claim 1, wherein:
the second error detector discards the frame in response to determining that the generated second error detecting code does not satisfy the condition set for the first error detecting code included in the frame.

7. The communication system according to claim 1, wherein:
the second error detector determines whether the generated second error detecting code matches the first error detecting code included in the frame.

8. The communication system according to claim 1, wherein:
the second error detector determines, based on time indicated by a value of the third counter and time indicated by the value of the first counter included in the frame, whether the frame has arrived at the second communication device within a set time period, and discards the frame in response to determining that the frame has not arrived at the second communication device within the set time period.

9. The communication system according to claim 1, wherein:
the first communication device includes a first storage to store information indicating the predetermined timing and information indicating the predetermined method, and
the second communication device includes a second storage to store information indicating the predetermined timing and information indicating the predetermined method.

10. The communication system according to claim 1, wherein the first communication device includes:
a first storage to store information indicating the predetermined timing and information indicating the predetermined method, and
a notifier to provide the information stored in the first storage to the second communication device.

11. A communication device for communicating with a different communication device, the different communication device including a first counter to count an elapsed time and a second counter to count an overflow of the first counter, the different communication device being configured to replace a value of the second counter with a value generated at predetermined timing with a predetermined method to cause the second counter to show dispersed values, to generate a first error detecting code based on a value of the first counter and the value of the second counter, and to generate a frame and transmit the generated frame to the communication device, the frame including data to be forwarded to the communication device, and the value of the first counter and the first error detecting code added to the data,
the communication device comprising processing circuitry which includes:
a second clock including a third counter to count an elapsed time, and a fourth counter to count an overflow of the third counter;
a second data converter to replace a value of the fourth counter with a value generated at the predetermined timing with the predetermined method to cause the fourth counter to show dispersed values;
a second communicator to receive the frame from the different communication device; and
a second error detector to generate a second error detecting code based on the value of the first counter included in the frame and the value of the fourth counter in the second clock, and determine whether the generated second error detecting code satisfies a condition set for the first error detecting code included in the frame.

12. A non-transitory computer readable recording medium storing a program for a communication system in which a first computer and a second computer communicate with each other,
the program causing the first computer to:
implement first clock including a first counter to count an elapsed time, and a second counter to count an overflow of the first counter;
cause the second counter to show dispersed values with a predetermined method; and
generate a first error detecting code based on a value of the first counter and a value of the second counter, and generate a frame and transmit the generated frame to the second computer, the frame including data to be forwarded to the second computer, and the value of the first counter and the first error detecting code added to the data, and
the program causing the second computer to:
implement second clock including a third counter to count an elapsed time, and a fourth counter to count an overflow of the third counter;
cause the fourth counter to show dispersed values with the same method as used by the first computer; and
generate a second error detecting code based on the value of the first counter included in the frame and transmitted from the first computer and a value of the fourth counter in the second clock, and determine whether the second error detecting code satisfies a condition set for the first error detecting code included in the frame.

13. The communication device according to claim 11, wherein:
the second counter has a same initial value as the fourth counter.

14. The communication device according to claim 11, wherein:

the different communication device includes a first data converter to replace a value of the second counter within a specified range with a value shifted by a specified number of bits in a specified direction, and the second data converter replaces a value of the fourth counter with a same method as used by the first data converter.

15. The communication device according to claim 11, Wherein:

the different communication device includes a first data converter replaces a value of the second counter within a specified range with a random number generated with a specified generation method, and the second data converter replaces a value of the fourth counter with a same method as used by the first data converter.

16. The communication device according to claim 11, Wherein:

the different communication device includes the first error detector configured to generate the first error detecting code based on the data to be forwarded to the communication device, the value of the first counter, and the value of the second counter, and the second error detector generates the second error detecting code based on the data forwarded to the communication device included in the frame, the value of the first counter included in the frame, and the value of the fourth counter in the second clock.

17. The communication device according to claim 11, wherein:

the second error detector discards the frame in response to determining that the generated second error detecting code does not satisfy the condition set for the first error detecting code included in the frame.

18. The communication device according to claim 11, wherein:

the second error detector determines whether the generated second error detecting code matches the first error detecting code included in the frame.

19. The communication device according to claim 11, wherein:

the second error detector determines, based on time indicated by a value of the third counter and time indicated by the value of the first counter included in the frame, whether the frame has arrived at the communication device within a set time period, and discards the frame in response to determining that the frame has not arrived at the communication device hire the set time period.

* * * * *